United States Patent [19]

Monden

[11] 4,225,933
[45] Sep. 30, 1980

[54] EXPONENTIAL FUNCTION COMPUTING APPARATUS

[75] Inventor: Hiroshi Monden, Tokyo, Japan

[73] Assignee: Nippon Electric Co., Ltd., Tokyo, Japan

[21] Appl. No.: 961,474

[22] Filed: Nov. 16, 1978

[30] Foreign Application Priority Data

Nov. 19, 1977 [JP] Japan .................. 52-138440

[51] Int. Cl.³ .................................. G06F 7/556
[52] U.S. Cl. .................................. 364/715; 364/753
[58] Field of Search ............. 364/715, 722, 753, 857; 328/145

[56] References Cited

U.S. PATENT DOCUMENTS

| | | | |
|---|---|---|---|
| 3,436,533 | 4/1969 | Moore et al. | 364/715 |
| 3,632,996 | 1/1972 | Paine | 364/722 X |

Primary Examiner—Jerry Smith
Attorney, Agent, or Firm—Blakely, Sokoloff, Taylor & Zafman

[57] ABSTRACT

An apparatus for computing an exponential function $a^x$ with an N radix computer where a represents a positive constant and where X is a variable. The apparatus includes an X register for storing X and a generator which sequentially generates the logarithmic value $\log_a (1+N^{-k})$ or $N^k \cdot \log_a (1+N^{-k})$ for values of k raning from o to m. Subtracting apparatus is provided which, for each logarithmic value generated, repeatedly subtracts the logarithmic value from the contents of the X register and stores the remainder in the X register until the contents of the register are less than the logarithmic value. The number of such repeated subtractions performed for each logarithmic value generated is stored in a Z register. A data shifting and adding apparatus is provided which upon termination of the repeated subtractions, sets an initial value in the X register and performs a sequence wherein a value is stored in a Y register which corresponds to the contents of the X register, the contents of the Y register are shifted k number of digits and the shifted contents are added to the contents of the X register. Such sequence is performed once for each of the repeated subtractions which had previously occurred as determined by the contents of the Z register with the value of k used in each sequence corresponding to that value used in the corresponding subtraction. Upon termination of the sequences, the final contents of the X register correspond to the value $a^x$.

11 Claims, 34 Drawing Figures

FIG.3A   CL
FIG.3B   CLD
FIG.3C   CLW
FIG.3D   TE
FIG.3E   TED
FIG.3F   TS
FIG.3G   INST.

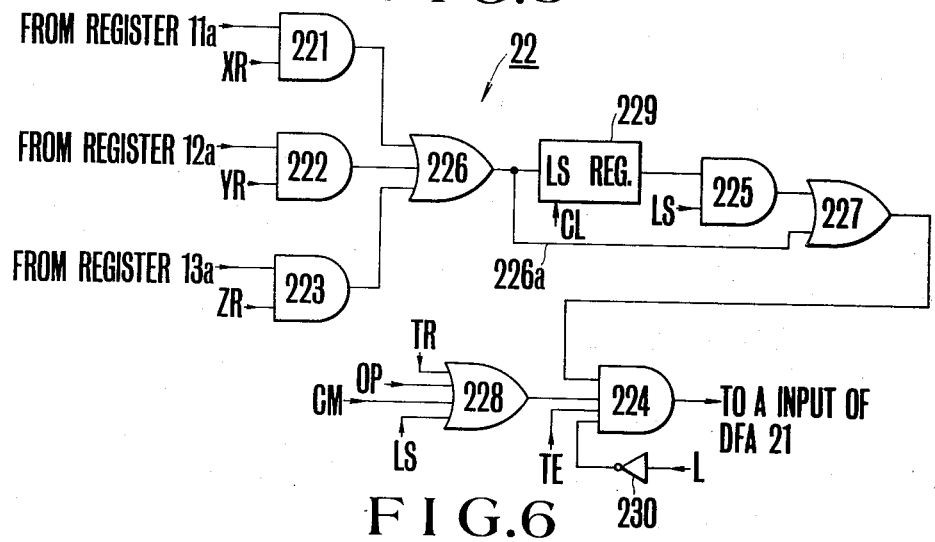
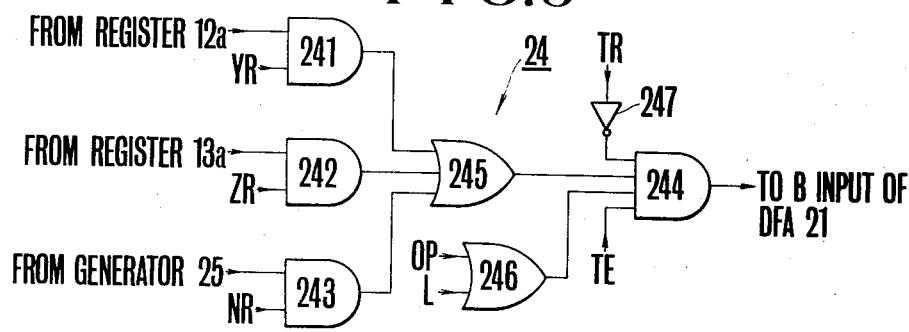
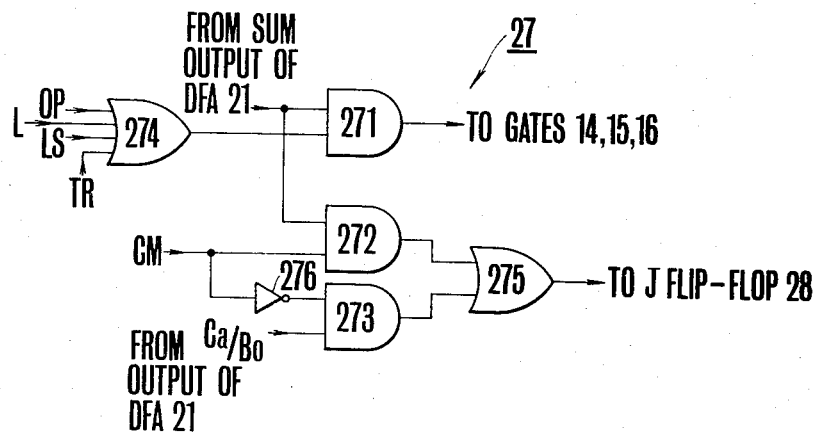

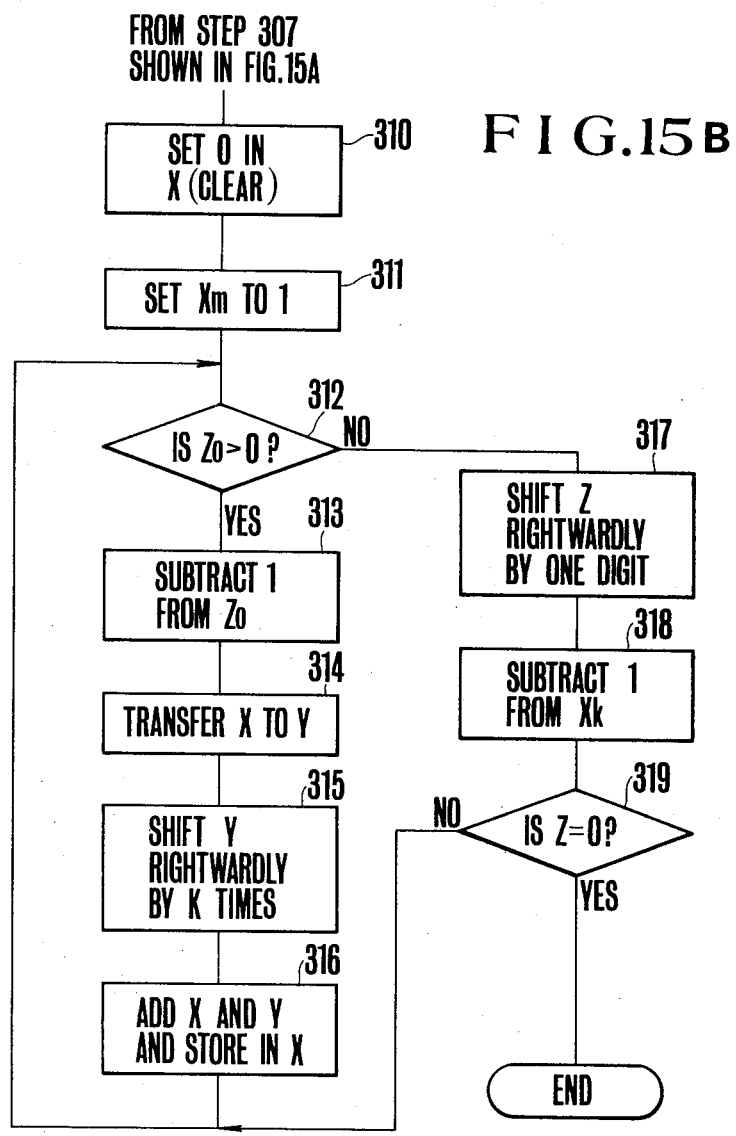

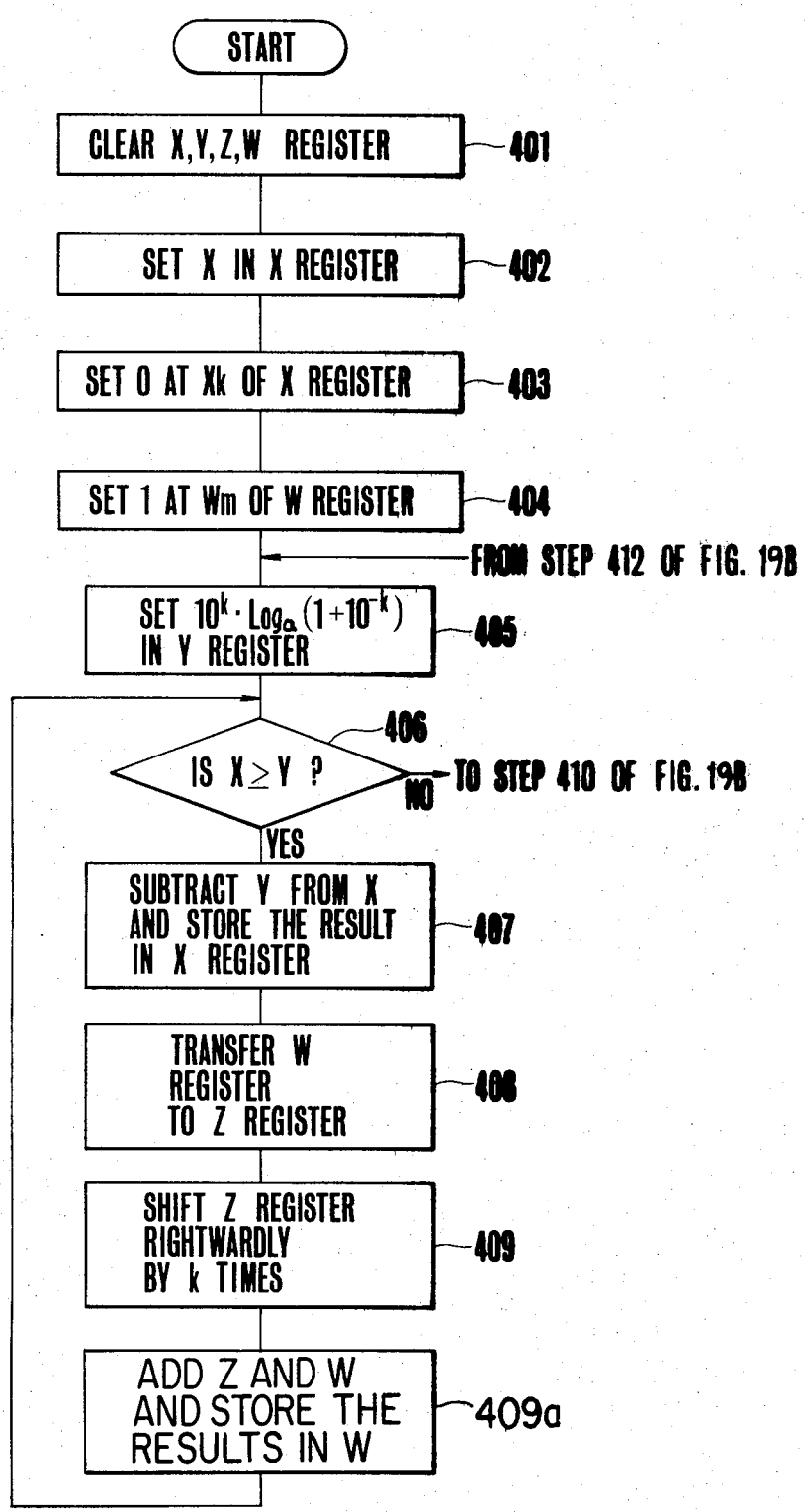

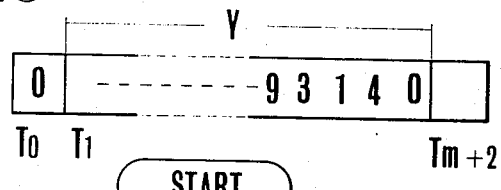

EXPONENTIAL FUNCTION COMPUTING APPARATUS

BACKGROUND OF THE INVENTION

This invention relates to exponential function computing apparatus utilized in an electronic computer for example.

An exponential function is expressed by $a^X$ where a represents a positive number and X a power, and every computer which computes technical data must have the performance of computing such function.

Among known systems of computing such functions are included a system wherein a relationship.

$$a^X = e^Y \text{ that is } y = X \cdot \log_a \quad (1)$$

is utilized to substitute $y = X \cdot \log_a$ for X in a power series $$e^X = 1 + X + (X^2/2!) + \ldots (X^n/n!) + \quad (2)$$

where $|X| < 1$ and systems utilizing continued fraction development and meromorphoric approximation.

Since all of these systems are well known it is believed it unnecessary to describe them in detail but each of them requires many multiplying and dividing operations so that there are such defects that the computation time is long and the accuracy of the computation is not always satisfactory.

SUMMARY OF THE INVENTION

Accordingly, it is an object of this invention to provide an improved exponential function computing apparatus which can decrease the computation time by increasing the computation speed than the prior art technique and to increase the accuracy of computation.

According to this invention, for the purpose of accomplishing this object, the multiplying operation is executed in a short time by data shifting and addition operations, thereby enabling to control at will the computation accuracy by the word length of the internal constant and to enable to readily compute exponential functions having different bases by merely changing the constant.

According to a preferred embodiment of the subject invention, an apparatus for computing an exponential $a^x$ with an N radix computer where a represents a positive constant and where X is a variable is disclosed. The apparatus includes an X register for storing the variable X and a generator which sequentially generates the logarithmic value $\log_a(1+N^{-k})$ or $N^k \cdot \log_a(1+N^{-k})$ for values of k ranging from o to m. Subtracting apparatus is provided which, for each logarithmic value generated, repeatedly subtracts the logarithmic value from the contents of the X register and stores the remainder in the X register until the contents of the register are less than the logarithmic value. The number of such repeated subtractions performed for each logarithmic value generated is stored in a Z register. A data shifting and adding apparatus is provided which, upon termination of the repeated subtractions, sets an initial value in the X register and performs a sequence wherein a value is stored in a Y register which corresponds to the contents of the X register, the contents of the Y register are shifted k number of digits and the shifted contents are added to the contents of the X register. Such sequence is performed once for each of the repeated subtractions which had previously occurred as determined by the contents of the Z register with the value of k used in each sequence. Corresponding to that value of k used in the corresponding subtraction. Upon termination of the sequences, the final contents of the X register correspond to the value of $a^x$.

Other embodiments of the subject invention are also disclosed, including, by way of example, an apparatus for computing an exponential function $a^x$ with an N radix computer where a represents a positive constant and X a variable, comprising: generating means for generating a logarithmic value $\log_a(1+N^{-k})$ or $N^k \cdot \log_a(1+N^{-k})$ where $k = 0,1,2 \ldots m$ and where the positive constant $a(a \neq 1)$ is the base of the logarithm; a first memory means; a subtracting means for carrying out a subtraction operation wherein the logarithmic value is subtracted from the contents of the first memory means and the remainder is stored in the first memory means; a second memory means; a third memory means; first shifting means for carrying out a first shift operation wherein a value corresponding to the contents of the second memory means is stored in the third memory means, the contents of the third memory means are shifted in a first predetermined direction k number of digits, and the shifted contents are added to the contents of the second memory means; second shifting means for carrying out a second shift operation wherein the contents of the first memory means are shifted by one digit in a second direction opposite the first direction; sequencing means for storing an initial value I in the second memory means, for storing a value corresponding to the variable X in the first memory means, for causing the generating means to sequentially generate the logarithmic value in a range from $k=o$ to $k=m$ and, for each logarithmic value generated, for carrying out a sequence wherein the substracting means and the first shifting means are repeatedly caused to carry out the subtraction operation and the first shift operation, respectively, until the contents of the first memory means are reduced to a value less than the logarithmic value, at which time said second shifting means is caused to carry out said second shift operation; whereby upon termination of the final second shift operation for $k=m$, the contents of the second memory means corresponds to the value of $a^x$.

BRIEF DESCRIPTION OF THE DRAWINGS

Further objects and advantages and theory and operation of this invention can be more fully understood from the following detailed description taken in conjunction with the accompanying drawings in which:

FIGS. 3A through 3G are waveforms useful to explain the operation of the apparatus shown in FIG. 1;

FIGS. 4 through 7 show detailed examples of various gate circuits shown in FIG. 1;

FIGS. 15A and 15B are flow charts useful to explain the operation of the computing apparatus shown in FIG. 1;

FIGS. 19A and 19B are flow charts useful to explain the operation of the modified embodiment shown in FIG. 18;

FIG. 20 is a diagram showing a status in which 0.413926 is set in the Y register;

FIG. 21 is a flow chart useful to explain the rightward operation by k digits utilized in the flow charts shown in FIGS. 19A and 19B;

DESCRIPTION OF THE PREFERRED EMBODIMENTS

Figure 1:
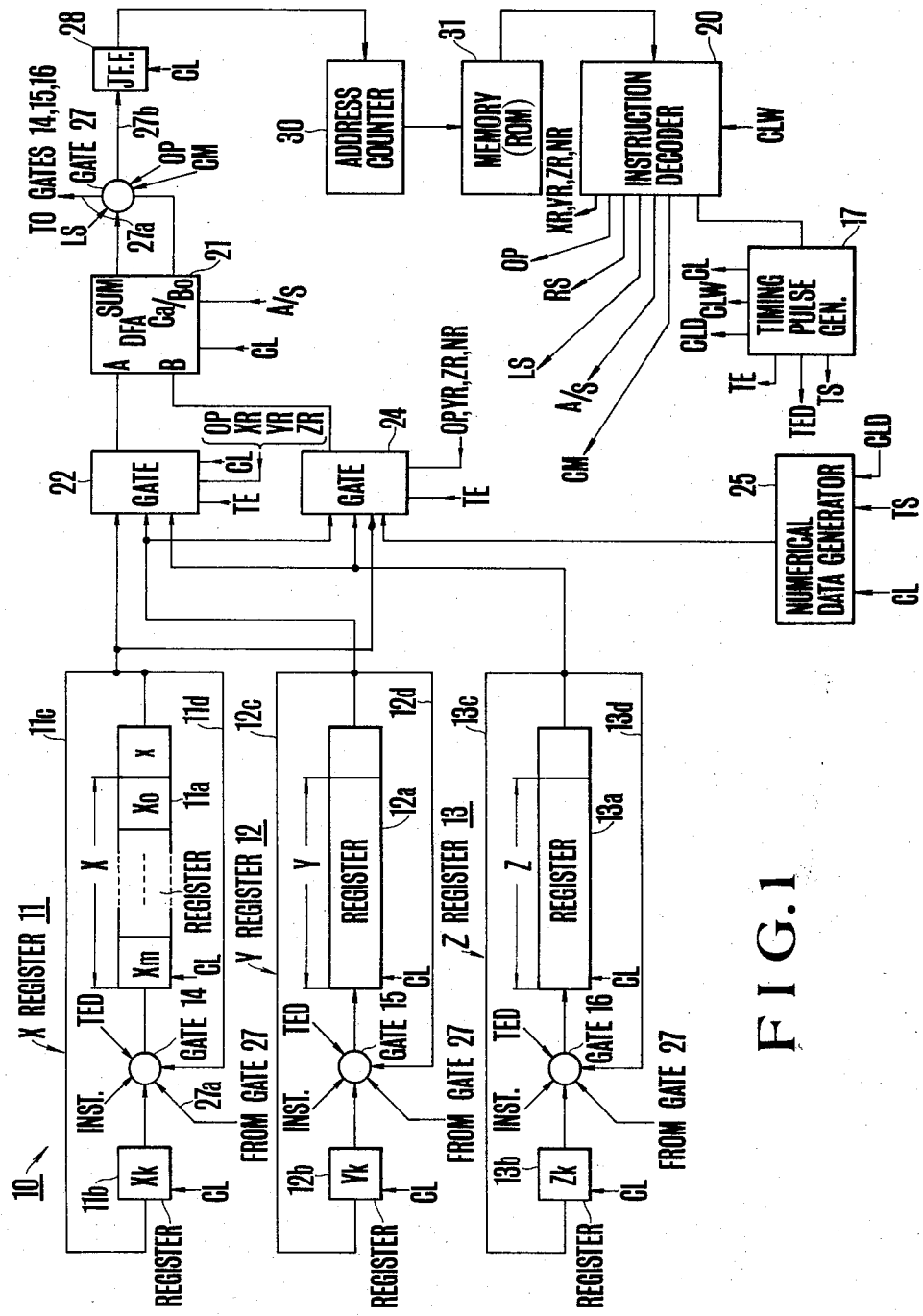
FIG. 1 is a block diagram showing one embodiment of the exponential function computing apparatus of this invention.

The principle of this invention will firstly be described.

Assume now that an exponential function $a^X$ is to be computed according to the addition theorem of this invention, and that X (X>0) is expressed as the sum of a digit train of $[X_K]$ $$X = X_0 + X_1 + \ldots + X_{n-1} \tag{3}$$

When the $a^X$ is expressed according to the addition theorem it is shown by the product of the known digit train $$a^X = 1 \times a^{X_0} \times a^{X_1} \times \ldots \times a^{X_{n-1}} \tag{4}$$

Since equation (4) includes n multiplying operations its computation is not simple.

Accordingly, the inventor has introduced the following digit train and contempleted multiplying of any terms thereof.

$$y_k = 1 + 10^{-k} \text{ (where N radix type } 1 + N^{-k}) \tag{5}$$

The product of terms $y_{k-1}$ and $y_k$ is $$y_{k-1} \times y_k = y_{k-1}(1+10^{-k}) = y_{k-1} + 10^{-k} y_{k-1} \tag{6}$$

The second term $10^{-k} y_{k-1}$ means a value obtained by shifting $y_{k-1}$ to the right by k digits. Thus, the multiplying operation of $y_k$ and $y_{k-1}$ can be obtained by adding a value obtained by shifting $y_{k-1}$ to the right by k times to $y_{k-1}$ that is by an addition operation.

For the purpose of applying this concept to the multiplying operation of equation (4) a digit train $[Z_k]$ expressed by the following equation is introduced instead of $[X_k]$ $$Z_k = \log_a y_x = \log_a(1+10^{-k}) \tag{7}$$

When equation (3) is expressed by using equation (7), generally since X is not completely decomposed by $[Z_k]$ the following equation results $$X = C_0 Z_0 + C_1 Z_1 + \ldots C_{n-1} \cdot Z_{n-1} + R \tag{8}$$

where $C_k$ is an integer of from 0 to 9 and R is a surplus that can not be expressed by $Z_k$. Consequently, $a^X$ to be determined is expressed by the following equation $$a^X = a^{C_0 Z_0} \times a^{C_1 Z_1} \times \ldots \times a^{C_{n-1} \cdot Z_{n-1}} \times a^R \tag{9}$$
$$= y^{C_0} \times y^{C_0} \times \ldots \times y^{C_{n-1}} \times a^R$$

$Z_k$ and R have a relationship $$Z_0 > Z_1 > \ldots > Z_{n-1} > R \tag{10}$$

Since this relationship satisfies an equation $$Z_{n-1} + \log_a(1+10^{-(n-1)}) \circledR 10^{-(n-1)} > R$$

it is possible to obtain an equation $$a^R \approx (1 + R \cdot \log_a) \tag{11}$$

Accordingly, $$a^X = (1 + R \cdot \log_a) \times y_0^{C_0} \times y_1^{C_1} \times \ldots \times y_{n-1}^{C_{n-1}} \tag{12}$$
$$= (1 + R \cdot \log_a) \times (1+1)^{C_0} \times (1+0.1)^{C_1} \times \ldots$$
$$\ldots \times (1+10^{-(n-1)})^{C_{n-1}}$$

The calculation of term $y^{C_k}$ can be performed by merely repeating the operation of equation (6) by $(C_k - 1)$ times for a first value of k.

The method of calculating $a^x$ according to this principle can be summarized as follows.

(a) $Z_0$ is generated for given X, $Z_0$ is subtracted repeatedly in a range in which X does not become negative by $C_0$ times. The surplus of the subtraction operations is made as the X is the next step.

(b) Then the value of k is increased by 1 to produce a corresponding sum and then the subtraction operations similar to (a) are repeated $C_k$ times in a range in which X does not become negative. The surplus of the subtraction operation is used as the X in the next step.

(c) The processing of item (b) is repeated until the processing of the value of $k = n-1$ is completed. At this stage values of $C_0 - C_{n-1}$ are determined.

(d) The value X as the step of item (c) (that is R expressed by equation (8)) is multiplied with log a, and 1 is added thereto to prepare an initial value.

(e) The operation of equation (6) is repeated starting from $k = n-1$. More particularly, I is used as the initial value and the following operation is repeated $(C_{n-1} - 1)$ times.

$$1 + 10^{-(n-1)} \cdot I \rightarrow I$$

After decreasing k by 1, the following operation is repeated by $C_k - 1$ times $$1 + 10^{-k} \cdot I \rightarrow I$$

(f) The value of I obtained at the time of completion of the operation of $k = 0$ represents $a^X$ to be determined.

Let us now consider a special case wherein $a = e$, that is $e^X$. Then equation (9) can be simplified as follows
$$e^R \approx 1 + R$$

With this equation any multiplying operation is not necessary to calculate the initial value.

Let us now consider the relationship between the number of processings of digits m of the computer and n (the maximum value of k) in the equation of calculation described above.

The calculation of $y_k^{Ck}$ for a large value of k is as follows $$y_k^{Ck} = y_k^{Ck-1} + 10^{-k}y_k^{Ck-1} \tag{13}$$
$$= y_k^{Ck-2} + 10^{-k}y_k^{Ck-2} + 10^{-k}y^{Ck-2} + 10^{-2k}y_k^{Ck-2}$$
$$\cdots\cdots\cdots$$
$$= 1 + 10^{-k} \cdot C_k + \overline{0}\ (10^{-2k})$$

where $\overline{0}\ (10^{-2k})$ represents all terms having $10^{-2k}$ as the coefficient.

When the digit is shifted to the right when the third term of equation satisfies a relationship $k > m/2$, the counter shifts out thus failing to obtain efficient data.

When an equation $$y_k^{Ck} = (1 + 10^{-k} \cdot C_k)\ (\text{where } k > m/2)$$

is used and when $a = e$, equation (12) is rewritten as follows $$e^X \approx (1 + R) \times (1 + 1)^{C_0} \times (1 + 0.1)^{C_1} \times \ldots \times \tag{14}$$
$$(1 + 10^{-m'})^{C_{n'}}\ldots\ldots$$
$$\times (1 + 10^{-(m'+1)} \cdot C_{m'+1}) \times \ldots (1 + 10^{-(n-1)} \cdot C_{n-1}) \tag{15}$$

where $m' = \left[\dfrac{m-1}{2}\right]$ and [ ] represent gauss. Since R is at an order of $10^{-n}$, by expressing $R = 10^{-n} \cdot R'$ we can obtain the following equation $$e^X \approx (1 + 1)^{C_0} \cdot (1 + 0.1)^{C_1} \cdot \ldots \cdot (1 + 10^{-m'})^{C_{n'}} \cdot \ldots \tag{16}$$
$$\cdot [1 + 10^{-(m'+1)} \cdot C_{m'+1} + 10^{-(m'+2)} \cdot C_{m'+2} + \ldots$$
$$+ 10^{-n}R']$$

The term in brackets [ ] in equation (16) is a value obtained by adding 1 to the surplus obtained when equation (8) is decomposed until $k = m'$. Thus the processing of items (a) through (g) described above to be executed for determining $a^x$ may be continued up to $$k = 0 - \left[\dfrac{m-1}{2}\right].$$

By using this principle, it is possible to further decrease the computation time and since in equation (8) the surplus is used repeatedly the accuracy of the computation can be improved.

The values of X that can be calculated according to this principle are 9 for $C_0 - C_k$ inclusive. Thus $$X \leq 9 \cdot \sum_{i=0}^{m} \cdot \log(1 + 10^{-m}) < 7.$$

Let us now describe in detail one embodiment of this invention with reference to the accompanying drawings.

FIG. 1 illustrates one embodiment the exponential function computing apparatus embodying the invention. The computing apparatus shown in FIG. 1 includes three X, Y and Z registers 11, 12 and 13. These registers are constituted by main registers 11a, 12a and 13a adapted to respectively accomodate a plurality of digits (each consisting of 4 bits) and registers 11b, 12b and 13b adapted to respectively accomodate data of 4 bits (one digit). The outputs of the main registers 11a, 12a and 13a are connected to the inputs of the registers 11b, 12b and 13b respectively through lines 11c, 12c and 13c and to the inputs of the main registers 11a, 12a and 13a respectively through gate circuits 14, 15 and 16. Thus, X, Y and Z registers 11, 12 and 13 constitute a circulating shift register having a number of digits represented by respective sums of the number of digits of the main registers 11a, 12a and 13a and one digits of respective registers 11b, 12b and 13b. The contents of the registers are shifted by a clock pulse CL (see FIG. 3) generated by a timing pulse generator 17.

Figure 2:
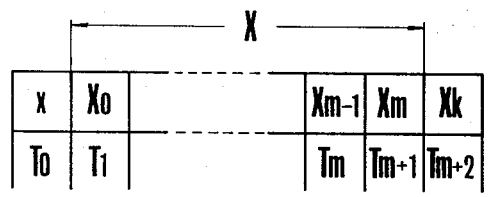
FIG. 2 is a diagram useful to explain the detailed construction of X register shown in FIG. 1 in relation to the digit time.

The relationship between the digits of respective registers and the timing will be described in brief with reference to FIG. 2 which shows the X register as an example. As shown, the X register 11 has digits of the number (m+3) which corresponds to the digit times $T_0$ through $T_{m+2}$, wherein the digit corresponding to $T_0$ is denoted by x, the digits $X_0 - X_m$ corresponding to $T_1 - T_{m+1}$ are denoted by X and that corresponding to $T_{m+2}$ is denoted by $X_k$. Normally, the digit x stores the decimal point position of numerical data, digits $X_0 - X_m$ store the numerical data and the digit $X_k$ stores various control data. In the following embodiment, for the purpose of simplifying the description, the position of the decimal point is fixed. For this reason, x is not used in the description. Actually, however, the position of the decimal point is stored in x as a power of 10.

Figure 4:
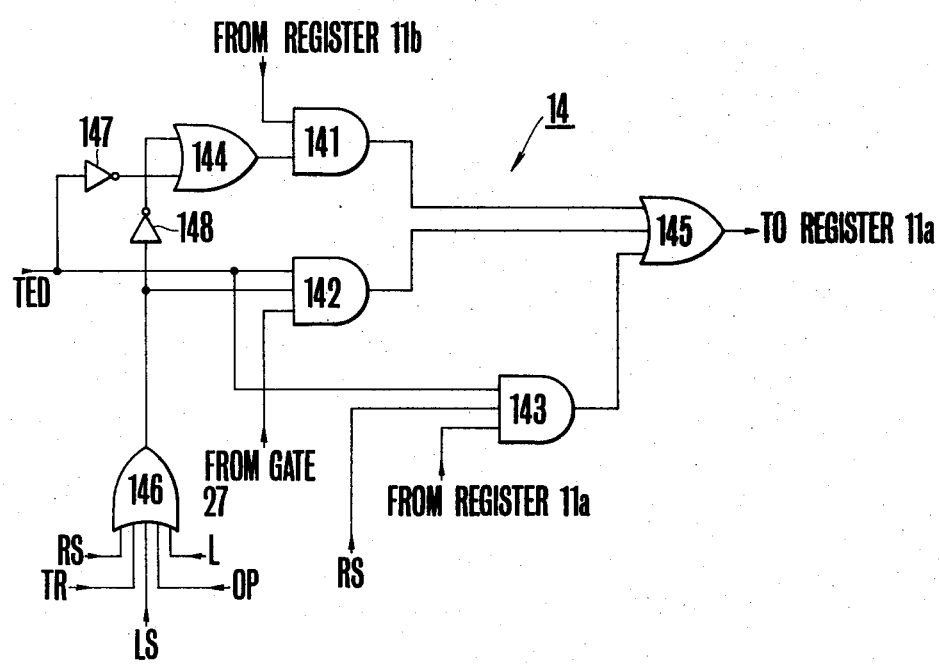

In addition to the outputs of the registers 11b, 12b and 13b, the gate circuits 14, 15 and 16 are connected to receive the instruction outputs OP, RS, LS, etc. of an instruction decoder 20 to be described later, the output TED of the timing pulse generator 17, the sum output (actually the output of the gate circuit 27) of a delayed full adder (DFA) 21, and the outputs of respective registers 11b, 12b and 13b which are supplied over lines 11d, 12d and 13d respectively, so as to perform logical operations based on these inputs. The details of these gate circuits are shown in FIG. 4.

The outputs of the X, Y and Z registers 11, 12 and 13 are sent to a gate circuit 22 which is controlled by an execution timing pulse TE generated by the timing pulse generator 17 and the instruction pulses OP, XR, YR, and ZR supplied by the instruction decoder 20 so as to supply a logical output to the input A of the delayed full adder 21. The details of the gate circuit 22 is shown in FIG. 5.

The outputs of the Y and Z registers 12 and 13 are sent to the inputs of a gate circuit 24 which is connected to also receive the output pulses of a numerical data generator 25. Similar to the gate circuit 22, this gate circuit 24 is also controlled by the pulse TE from the timing pulse generator 17 and the instruction pulses OP, YR, ZR, NR, etc. from the instruction decoder 20 to send a logical output to the input B of the delayed full adder 21. The detail of the gate circuit 24 is shown in FIG. 6. The delayed full adder 21 has a 4 bit construction and is provided with aforementioned input terminals, an output terminal SUM on which the sum of the inputs A and B is produced, a carry terminal $C_a$ and a borrow terminal $B_0$. The delayed full adder 21 is connected to receive the clock pulse CL from the timing pulse generator 17 and a pulse A/S from the instruction decoder 20 to perform an arithmetical (addition or subtraction) operation. The sum output, the carry output $C_a$ and the borrow output $B_0$ are sent to a gate circuit 27 and the output thereof is sent to gate circuits 14, 15 and 16 through a line $27_a$ and to a J flip-flop circuit 28 through a line $27_b$. The detail of the gate circuit 27 is shown in FIG. 7.

The output of the J flip-flop circuit 28 is sent to an address counter 30 which operates to designate the address of a read only memory device (ROM) 31 to control the program sequence. In the memory device 31 are stored instruction codes which control the operations of respective gate circuits through the instruction decoder.

The instruction decoder 20 decodes the instruction codes read out from the memory device 31 for producing micro-instructions for actuating various gate circuits. The output of the decoder 20 is under the control of the clock pulse CLW generated by the timing pulse generator for producing an output during the digit time interval of $T_0-T_{m+2}$ as shown in FIG. 3G.

The micro-timing instructions are as follows.
XR: selection instruction of X register 11
YR: selection instruction of Y register 12
ZR: selection instruction of Z register 13
OP: operation instruction
RS: rightward shift instruction
LS: leftward shift instruction A/S addition or substraction instruction CM: comparison instruction
L: setting instruction
TR: transfer instruction In response to a clock pulse generated by a self-contained clock pulse generator, the timing pulse generator 17 produces the following pulses.
CL: clock pulse (FIG. 3A)
CLD: pulse generated at every 4 CL pulses and corresponds to a digit signal (FIG. 3B)
CLW: pulse generated at time $T_{m+2}$ and corresponds to a word signal (FIG. 3C)
TE: execution timing pulse generated during an interval $T_0-T_{m+1}$ of the digit time (FIG. 3D)
TED: pulse obtained by delaying TE pulse by 1 digit time, thus it is produced during an interval of $T_1-T_{m+2}$ (FIG. 3E)
TS: pulse formed by pulses TE and $\overline{TED}$ (FIG. 3F)

With reference to FIGS. 3 through 7 the gate circuits 14, 15, 16 22, 24 and 27 will now be described in detail.

The gate circuits 14, 15 and 16 are described in connection with FIG. 4. Since these gate circuits have the same construction the gate circuit 14 utilized in the register 11 will be described as representative. As shown in FIG. 4, the gate circuit 14 comprises AND gate circuits 141, 142 and 143, OR gate circuits 144, 145 and 146 and inverters 147 and 148. The AND gate circuit 141 is provided with two input terminals, one receiving the output of the register 11b shown in FIG. 11 and the other receiving the output of OR gate circuit 144. The OR gate circuit 144 is connected to receive the instructions, that is pulses RS, LS, OP, TR and L from the instruction decoder 20 via an inverter 148, and the AND gate circuit 142 is connected to receive the TED pulse and instruction pulses RS, LS, OP, TR and L at its one input, and the SUM signal from the delayed full adder 21 through the gate circuit 27 and line 27a at the other input. The AND gate circuit 143 has three inputs, one receiving the TED pulse, one receiving the RS instruction pulse, and the remaining receiving the output of the register 11a of the X register 11 over line 11d. The outputs of respective AND gate circuits 141, 142 and 143 are supplied to the inputs of the OR gate circuit 145, the output thereof being supplied to the input of register 11a.

The AND gate circuit 141 is enabled when the TED pulse and either one of TED pulse and one of the instruction pulses are applied thereto to send the output of the register 11b to the input of register 11a via OR gate circuit 145.

The gate circuit 22 will now be described with reference to FIG. 5. As shown, the gate circuit 22 comprises AND gate circuits 221 through 225, OR gate circuits 226, 227, 228 and 230, and a leftward shifting register 229 of 4 bit construction. The purpose of the AND gate circuits 221, 222 and 223 is to determined which one of the X, Y and Z registers should be selected. These AND gate circuits receive the outputs of respective registers 11a, 12a and 13a and XR, YR and ZR pulses respectively generated by the instruction decoder 20 and the outputs of these AND gate circuits are applied to the inputs of the OR gate circuit 226, the output thereof being supplied to the leftwardly shifting register 229 and to the input of the OR gate circuit 227 through line 226a. The output of leftwardly shifting register 229 is sent to one input of an AND gate circuit 225 with the other input connected to receive the LS pulse. The output of the AND gate circuit 225 is applied to one input of the OR gate circuit 227, and the output thereof is sent to one input of AND gate circuit 224. The other inputs of this AND gate circuit are connected to receive the TE pulse, instruction pulses TR, CM, OP and LS through OR gate circuit 228, and the instruction pulse L via inverter 230. The output of the AND gate circuit 224 is supplied to input A of the delayed full adder 21.

The gate circuit 24 will now be described with reference to FIG. 6. As shown, this gate circuit comprises AND gate circuits 241—244, OR gate circuits 245 and 246 and an inverter 247. The AND gate circuits 241, 242 and 243 function to select the outputs of registers 12a and 13a and the output of the numerical data generator 25 in accordance with the selection instructions YR, ZR and NR sent from the instruction decoder 20 and the outputs of these AND gate circuit are applied to one input of the AND gate circuit 244 via OR gate circuit 245. The AND gate circuit 244 is provided with other inputs connected to receive pulse TE, the pulses OP and L through OR gate circuit 246 and the pulse TR through inverter 247. The output of the AND gate circuit 244 is applied to the input B of the delayed full adder 21.

The detailed construction of the gate circuit 27 is shown in FIG. 7. As shown, it comprises AND gate circuits 271, 272 and 273, OR gate circuits 274 and 275 and an inverter 276. The AND gate circuit 271 is provided with a first input connected to receiver the SUM output of the delayed full adder 21 and second input connected to receive pulses TR, L, OP and LS through OR gate circuit 274. The output of the AND gate circuit 271 is applied to the gate circuits 14, 15 and 16 of the X, Y, Z registers 11, 12 and 13.

The AND gate circuit 272 is provided with two inputs, one receiving the SUM output of the delayed full adder 21 and the other receiving pulse CM. The output of the AND gate circuit 272 is supplied to one input of OR gate circuit 275 having its output connected to the J flip-flop circuit 28. The AND gate circuit 273 is provided with two inputs, one receiving pulse CM through inverter 276 and the other receiving a $C_a/B_0$ output of the delayed full adder 21. The output of this AND gate circuit is supplied to the J flip-flop circuit 28 through the other input of the OR gate circuit 275.

Accordingly, when supplied with instructions TR, L, OP or LS, the gate circuit 27 sends the SUM output of the delayed full adder 21 to the gate circuits 14, 15 and 16 whereas when the gate circuit 27 is supplied with instruction CM it sends the SUM output of the delayed full adder 21 to the J flip-flop circuit 28. When the $C_a/B_0$ output is received from the delayed full adder 21 in the absence of instruction CM, the output $C_a/B_0$ is sent to the J flip-flop circuit 28.

Figure 8:
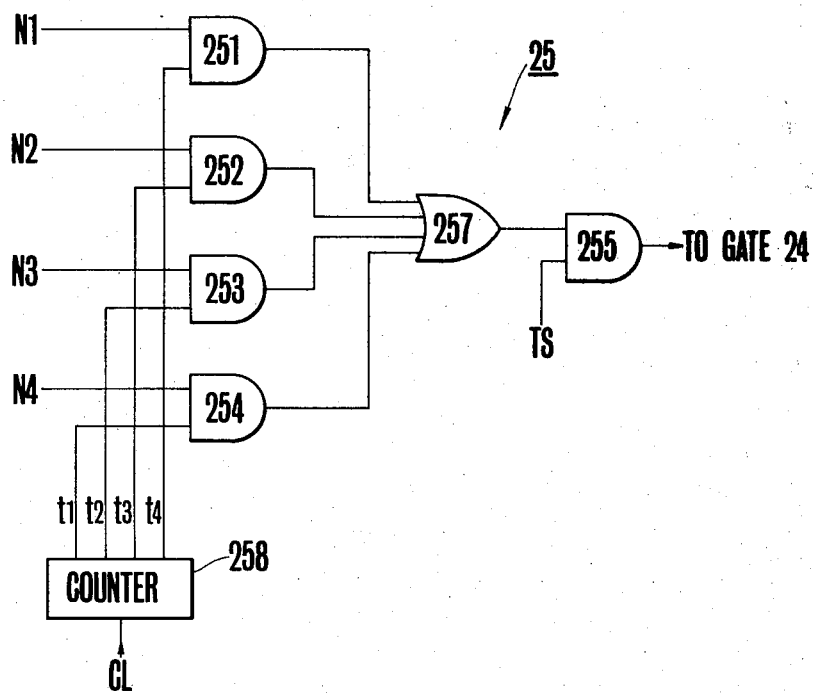
FIG. 8 is a connection diagram showing one example of the numerical data generator shown in FIG. 1.

The details of the numerical data generator 25 will now be described with reference to FIG. 8. As shown it comprises AND gate circuits 251 through 255, an OR gate circuit 257 and a counter 258. One of the inputs of the AND gate circuits 251 through 254 are supplied with set inputs $N_1$ through $N_4$ which constitute the contents of the 4 bits that form one digit of data. The inputs of these AND gate circuits are supplied with pulses $t_1$ through $t_4$ respectively of the counter 258. This counter operates in response to pulse CL to send out pulses $t_1$ through $t_4$ in synchronism with the pulse CL during an interval of $T_0$. The counter is reset in a manner well known in the art. The outputs of the AND gate circuits 251–254 are applied to the inputs of OR gate circuit 257. The output thereof is applied to one input of AND gate circuit 255 having the other input connected to receive pulse TS. Accordingly, the AND gate circuit 255 applies its output to the gate circuit 24 with the timing of the pulse TS.

Figure 10:
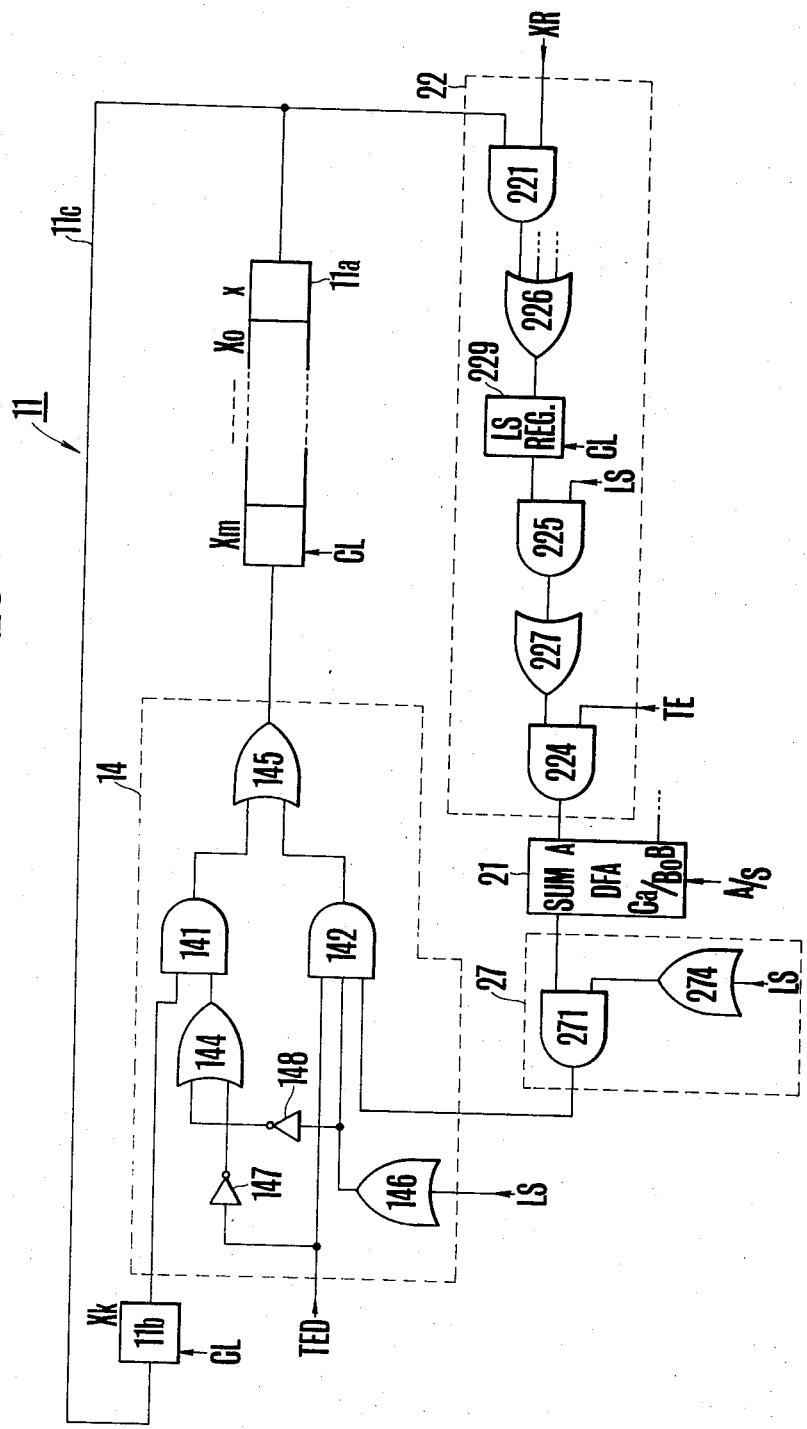
Figure 11:
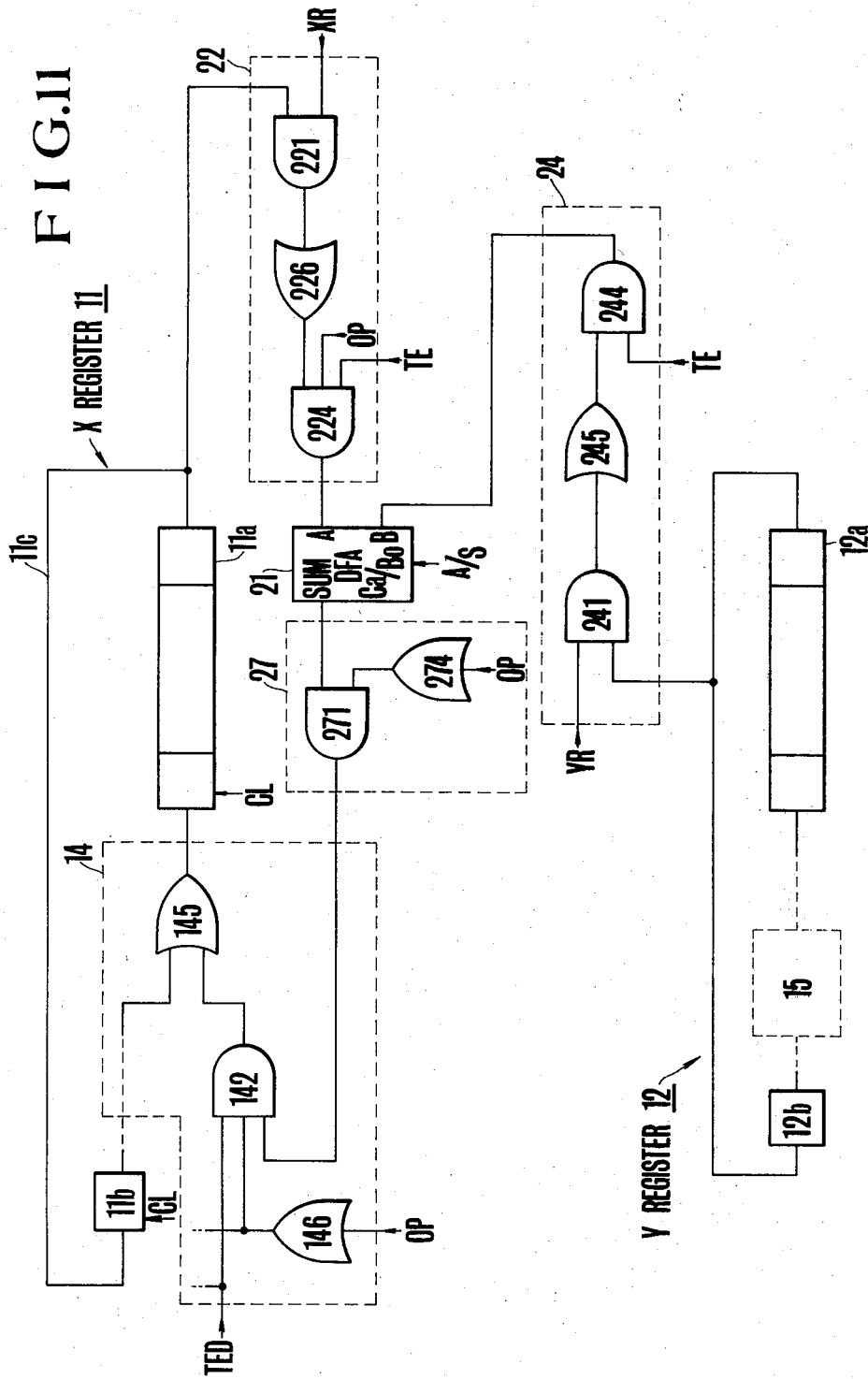

The basic operation of the circuit shown in FIG. 1 will now be described with reference to the foregoing drawings and FIGS. 9, 10 and 11.

(1) Rightward shifting operation of the registers.

X register 11 will be described as the representative.

Figure 9:
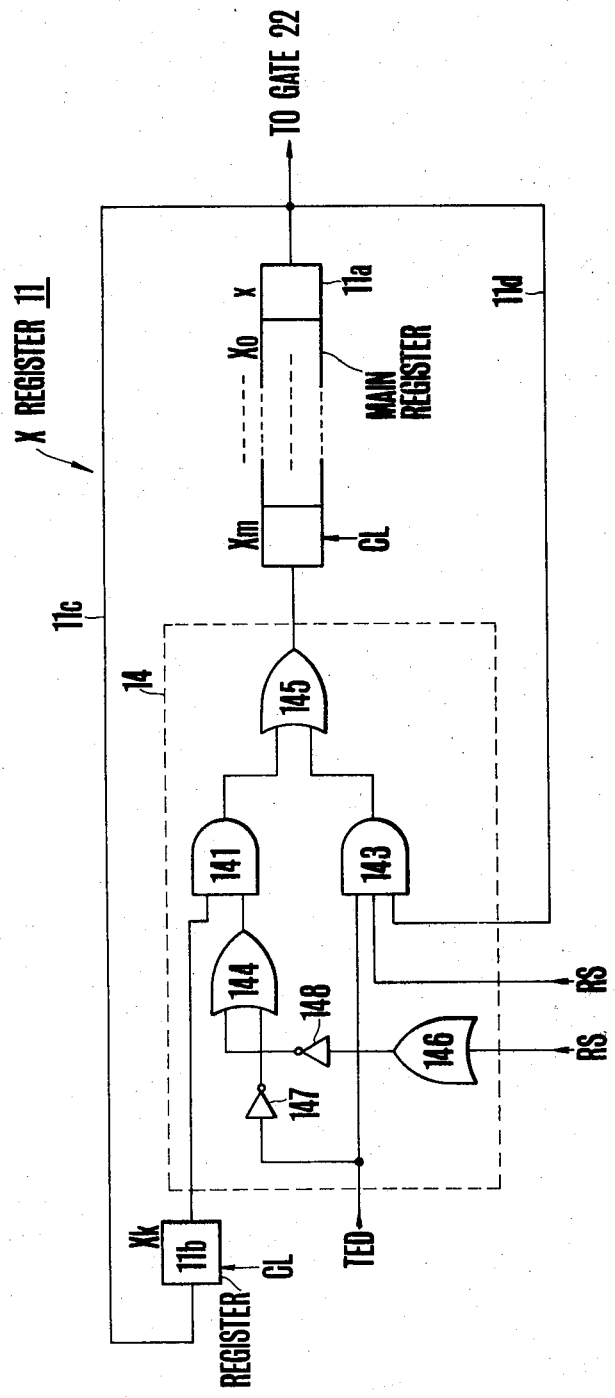
FIGS. 9 through 14 are connection diagrams useful to explain the basic operation of the computing apparatus shown in FIG. 1.

FIG. 9 shows only the component elements shown in FIG. 1 which are related to this operation. Normally, the content of the X register 11 is circulated and held by a loop including register 11a-line 11c-register 11b-AND gate circuit 141 and OR gate circuit of gate circuit 14-register 11a. At this time, since the TED instruction is not produced by the instruction decoder 20 various instructions are also not supplied. Consequently, the output of the inverter 148 is "1" which is supplied to the AND gate circuit 141 via OR gate circuit 144 thus maintaining the gate circuit in its enabled state.

When a rightward shift instruction RS is generated by the instruction decoder 20 under these conditions, this instruction is supplied to the OR gate circuit 146 and the AND gate circuit 143 during an interval of $T_0 - T_{m+2}$.

Since instruction RS is supplied to the OR gate circuit 146 at digit time $T_0$ the inverter 148 does not produce any output. Inverter 147 and AND gate circuit 143 are not supplied with pulse TED. Consequently, the AND gate circuit 141 is enabled to supply the content $X_k$ of register 11b to the input of the main register 11a in response to pulse CL, whereby the content of the X register 11 is shifted toward right by one digit.

At digit time $T_1$, the pulse TED is supplied to inverter 147 and AND gate circuit 143 with the result that the AND gate circuit 141 is disenabled. Consequently, thereafter, the output of the register 11b will not be applied to the main register 11a. On the other hand, AND gate circuit 143 is enabled at time $T_1$ so that the content X of the main register 11a is shifted from the righthand end of the register through a loop including register 11a-line 11d-AND gate circuit 143-OR gate circuit 145-and register 11a. Consequently the contents x, $X_0 \ldots X_m$ which have been stored in the register 11a shown in FIG. 1 are sequentially shifted from the output side to the input side of the main register 11a at successive digit times $T_1$ through $T_{m+1}$. Accordingly, at the end of the digit time $T_{m+1}$ the original state is resumed and at digit time $T_{m+2}$, since pulse TED is still being generated, the status is shifted rightwardly by one digit, thus completing the rightward shifting operation.

The rightward shifting operation described above also occurs in the Y and Z registers 12 and 13.

(2) Leftward shifting operation of the registers.

The leftward shifting operation of the content of register 11, for example, will now be described with reference to FIG. 10. At this time, the instruction LS is applied to the AND gate circuits 142 of the gate circuit 14 and the AND gate circuit 225 of the gate circuit 22 from the instruction decoder 20 during an interval of $T_0 - T_{m+2}$, and X instruction for selecting the X register is applied to the AND gate circuit 221 of the gate circuit 22 during an interval of $T_0 - T_{m+2}$. Further, an instruction LS is applied to the AND gate circuit 271 of the gate circuit 27 shown in FIG. 7 during an interval of $T_0 - T_{m+2}$. Furthermore, an addition instruction A or a subtraction instruction S is supplied to the delayed full adder 21.

Under these conditions, at digit time $T_0$, similar to the rightward shifting operation described above, since the AND gate circuit 141 is not supplied with pulse TED it is enabled to shift the content $X_k$ of the register 11b to the input terminal of the main register 11a. At this time, the content X of the main register 11a is sent from the righthand end of the register to the leftwardly shifting register 229 via the AND gate circuit 221 and the OR gate circuit 226 of the gate circuit 22 shown in FIG. 5.

Then at the digit time $T_1$, the pulse TED is supplied so that AND gate circuit 141 is desenabled to stop the shifting of data from register 11b to register 11a. At this time, since AND gate circuit 224 is being enabled by pulse TE, the content of the register 229 would be supplied to the input of the delayed full adder 21. At this time, no input is applied to the input terminals of the delayed full adder 21. Accordingly, the full adder 21 operates to execute a subtraction operation (A−0) or an addition operation (A+0) whereby the delayed full adder 21 produces the content of register 221, that is the content of register 11a which is sequentially produced on the output of the delayed full adder 21. However, at this time, the delayed full adder 21 would not send its output to the main register 11a. Accordingly, at this time no data is applied to the main register 11a.

At the digit time $T_2$, the SUM output of the delayed full adder 21 is supplied to the input of the main register 11a via AND gate circuits 271 and 142 and OR gate circuit 145 shown in FIG. 9. As a consequence, upon receiving pulse TED, the AND gate circuit 142 is enabled to send the output of the delayed full adder 21 to succeeding states. More particularly, in response to pulse TED, the AND gate circuit 142 is enabled during an interval $T_1 - T_{m+2}$ to supply the output of the main register 11a to its input. At digit time $T_2$, the content X which has been stored at the righthand end of the register 11a will be supplied to the input of the register 11a. Accordingly, after a digit time $T_{m+2}$ the leftward shifting operation is completed and the content of the register 11a will be shifted to a state which is one digit leftward to the initial state. Under these conditions, the content $X_m$ which has been stored at the lefthand end of the register 11a would not be shifted to the input of the main register 11a but dropped out.

(3) Addition and subtraction operations between registers.

The operation of adding the content of X register 11 to that of Y register 12 and then storing the sum in X register 11 will be described hereunder with reference to FIG. 11. At this time, an A/S instruction is applied to the delayed full adder 21 from the instruction decoder 20 while at the same time an instruction OP is supplied to respective gate circuits 14, 15, 22, 24 and 27. Furthermore, XR and YR instructions are supplied to the gate circuits 22 and 24 for respectively selecting X and Y registers.

Under these conditions, the content at the right-hand end of the main register 11a of the X register 11 is supplied to the input A of the delayed full adder 21 via AND gate circuit 221, OR gate circuit 226, and AND gate circuit 224 which is enabled in response to pulse TE during an interval of $T_0-T_{m+1}$.

The content at the righthand end of the main register 12a of Y register 12 is supplied to the input B of the delayed full adder 21 via AND gate circuit 241, OR gate circuit 245, and AND gate circuit 244. At this time, in response to pulse TE, the AND gate circuit 224 is enabled during an interval $T_0-T_{m+1}$. In response to the instruction A or S from the instruction decoder 20, the delayed full adder 21 adds or subtracts the values supplied to its inputs terminals A and B, and the result of this operation is sent to the AND gate circuit 142 via AND gate circuit 271. In response to pulse TED, AND gate circuit 142 supplies the SUM output of the delayed full adder 21 to the main register 11a. As has been pointed out before register 11a has stored the content of register 11b at the digit time $T_0$.

When the delayed full adder 21 produces a carry signal ($C_a$) or a borrow signal ($B_0$) as the result of its addition or subtraction operation, an output is produced on its $C_a/B_0$ output, which is sent to the J flip-flop circuit 28 via AND gate circuit 273 and OR gate circuit 275 of the gate circuit 27. It should be noted that, under these conditions, instruction CM is not supplied and the AND gate circuit 273 is enabled by the output of inverter 276. Consequently, the output of the J flip-flop circuit 28 modifies the operation of the address counter 30 so as to read out the next instruction from the memory device 31. The J flip-flop circuit 28 is reset when the next instruction is decoded.

(4) Subtraction operation between the registers and the numerical data.

Figure 12:
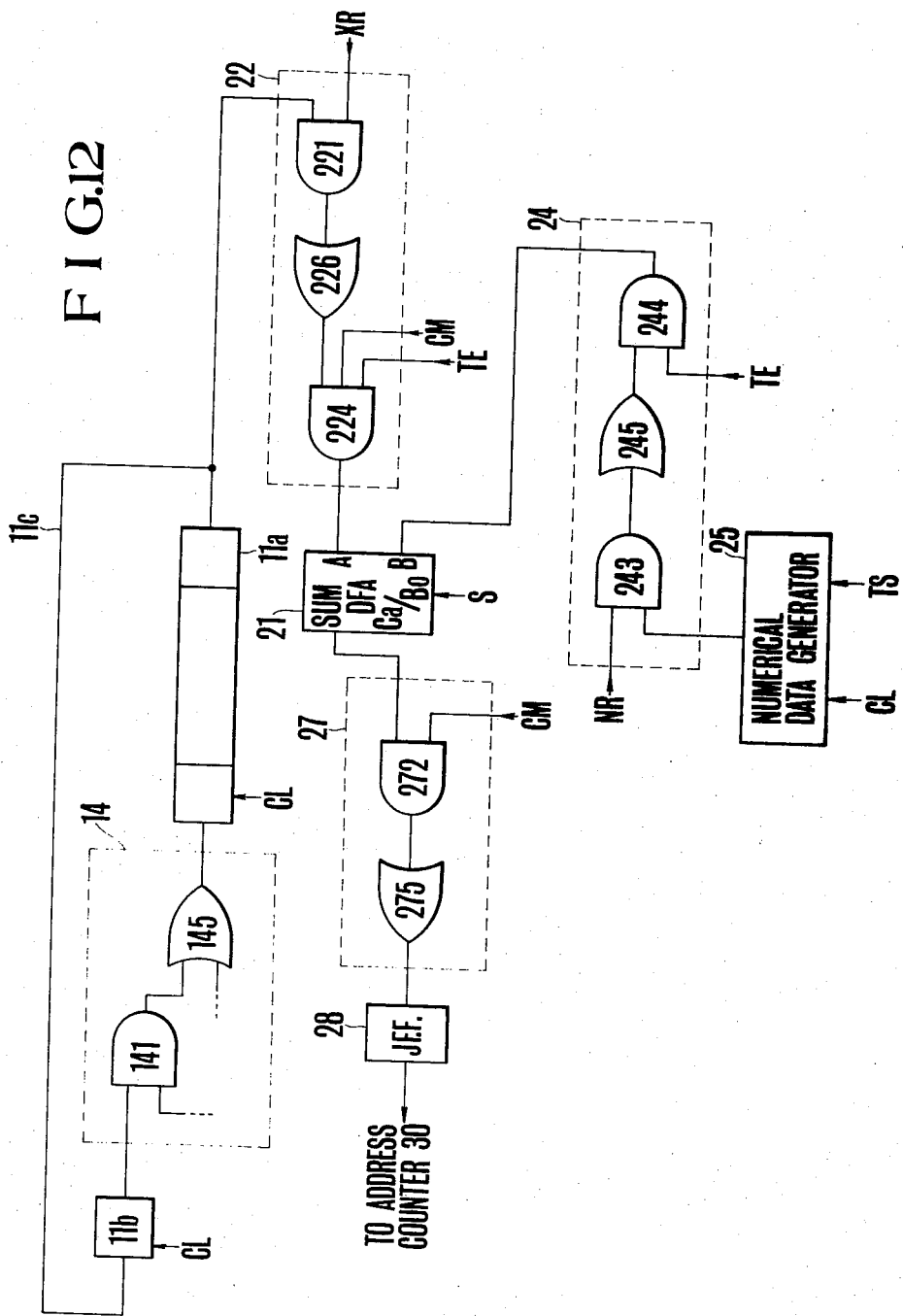

This operation is similar to the addition and subtraction operations between the registers described in item (3) except the following. More particularly, in this case an instruction NR is sent from the instruction decoder 20 to the gate circuit 24 for selecting the numerical data generator 25. As a consequence, the AND gate circuit 243 of the gate circuit 24 is enabled to supply the output of the numerical data generator 25 to the input B of the delayed full adder 21 via AND gate circuit 243, OR gate circuit 245, and AND gate circuit 244 as shown in FIG. 12. At this time, the output of the numerical data generator 25 is generated only for the first digit, or at the digit time $T_0$. The addition or subtraction operation of the delayed full adder 21 between the numerical data supplied to its input B and the content of the X register supplied to input A is the same as has been described hereinabove.

(5) Comparison operaion between the content of the register and the numerical data.

This operation will be described with reference to FIG. 12 by taking X register 11 as a representive of the register to be compared. More particularly, an instruction NR for selecting the numerical data generator 25 is supplied to gate circuit 24 from the instruction decoder 20 while at the same time, an instruction CM is supplied to gate circuits 22 and 27. Further, an instruction XR for selecting the X register is supplied to the gate circuit 22. Under these conditions the delayed full adder 21 is supplied with subtraction instruction S.

Thus, since the OR gate circuit 146 of the gate circuit 14 is not supplied with any instruction, AND gate circuits 142 and 143 are disenabled so that the content of the main register 11a is circulated and held through a loop including register 11a-line 11c-register 11b-AND gate circuit 141-OR gate circuit 145-and main register 11a. As shown in FIG. 12, the content thus held is sent to the input A of the delayed full adder 21 from the righthand end of the register 11a via AND gate circuit 221, OR gate circuit 226 and AND gate circuit 224. At this time, the output of the numerical data generator 25 is supplied to the input B of the delayed full adder 21 through AND gate circuit 243, OR gate circuit 245 and AND gate circuit 244 under the control of pulse TE. Consequently, the delayed full adder 21 subtracts input B from input A. When the delayed full adder 21 produces a SUM output, it is supplied to the J flip-flop circuit 28 via AND gate circuit 272 and OR gate circuit 275 to set the J flip-flop circuit 28. Due to this change in the state the fact that the outputs of register 11 and the numerical data generator 25 do not coincide with each other is provided to the address counter 30 whereby the decoder 20 is caused to send out the next instruction. If the outputs of X register 11 and numerical data generator 25 coincide with each other, so that the result of subtraction operation is "0" the SUM output would not be produced whereby the J flip-flop circuit 28 would not be set.

In the foregoing description, although the content of the X register 11 was compared with the numerical data, the contents of the Y and X registers 12 and 13 are compared in the same manner.

(6) Loading operation of the numerical data into the register.

In this case, instruction L which is one of the inputs to the AND gate circuit 224 of the gate circuit 22 shown in FIG. 5 is supplied to one input of AND gate circuit 224 with the result that this AND gate circuit is disenabled to inhibit the application of an input to the input A of the delayed full adder 21 irrespective of the condition of the other inputs of the AND gate circuit 224. Further, at this time, an instruction L is also supplied to OR gate circuit 246 of the gate circuit 24, and an instruction NR is supplied to AND gate circuit 243 so as to apply an addition instruction A to the delayed full adder 21.

Figure 13:
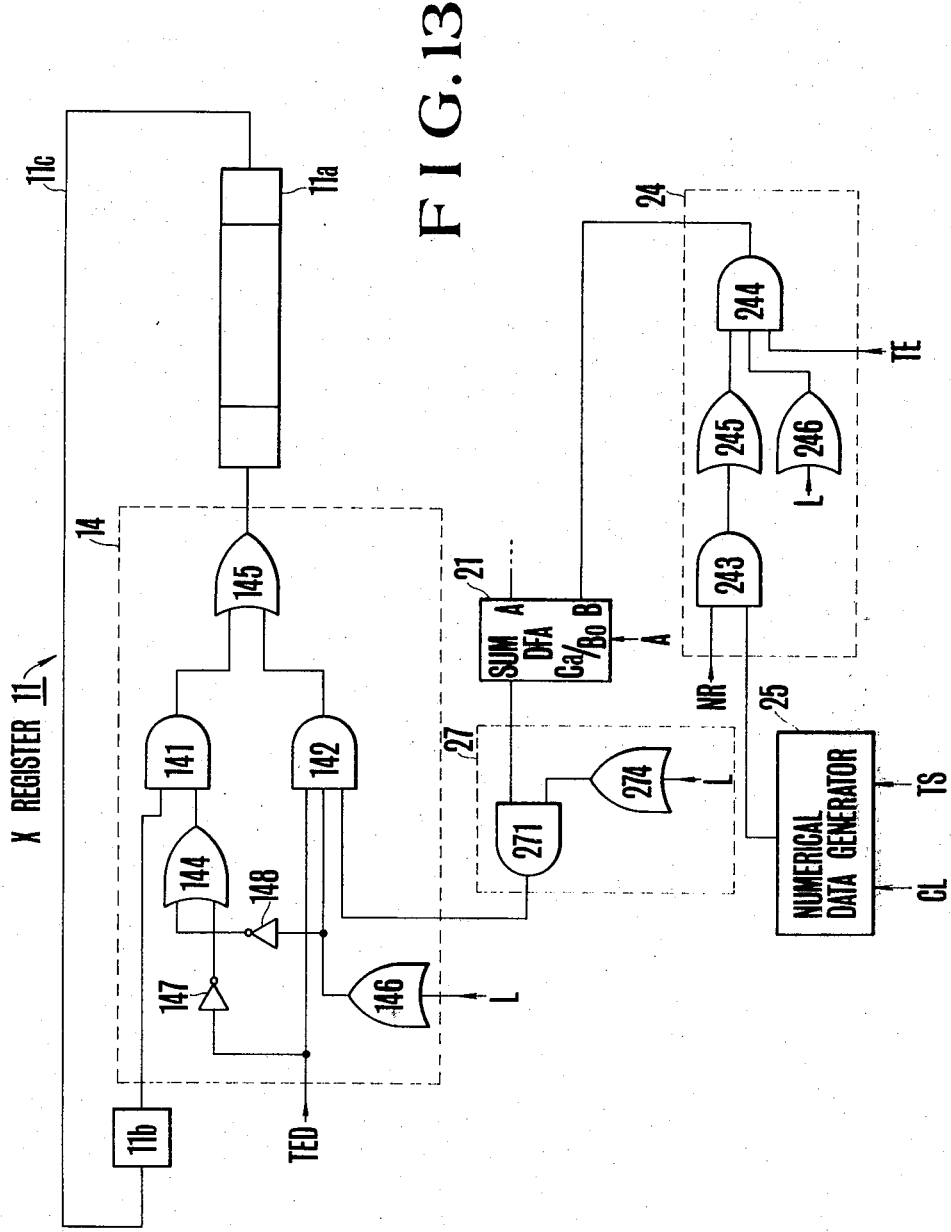

To load the X register 11, a circuit shown in FIG. 13 is formed. More particularly, the output of the numerical data generator 25 is supplied to input B of the delayed full adder 21 via AND gate circuit 243, OR gate circuit 245 and AND gate circuit 244. As has been described hereinbefore, at this time since no surplus input is applied to input A, the output of the numerical data generator 25 will be produced as the SUM output without any change. The SUM output is applied to the input of the main register 11a via AND gate circuits 271 and 142 and OR gate circuit 145. Thus, the numerical data generator 25 stores predetermined data in registers 11a and 11b for each digit as digit times of from $T_0$ to $T_{m+2}$. Of course, the numerical data generator 25 can generate different data for respective digits. As the timing pulse applied to the main register 11a is used pulse TED by taking into consideration the one digit delay caused by the delayed full adder 21.

(7) Data transfer operation to the other registers from X register.

Figure 14:
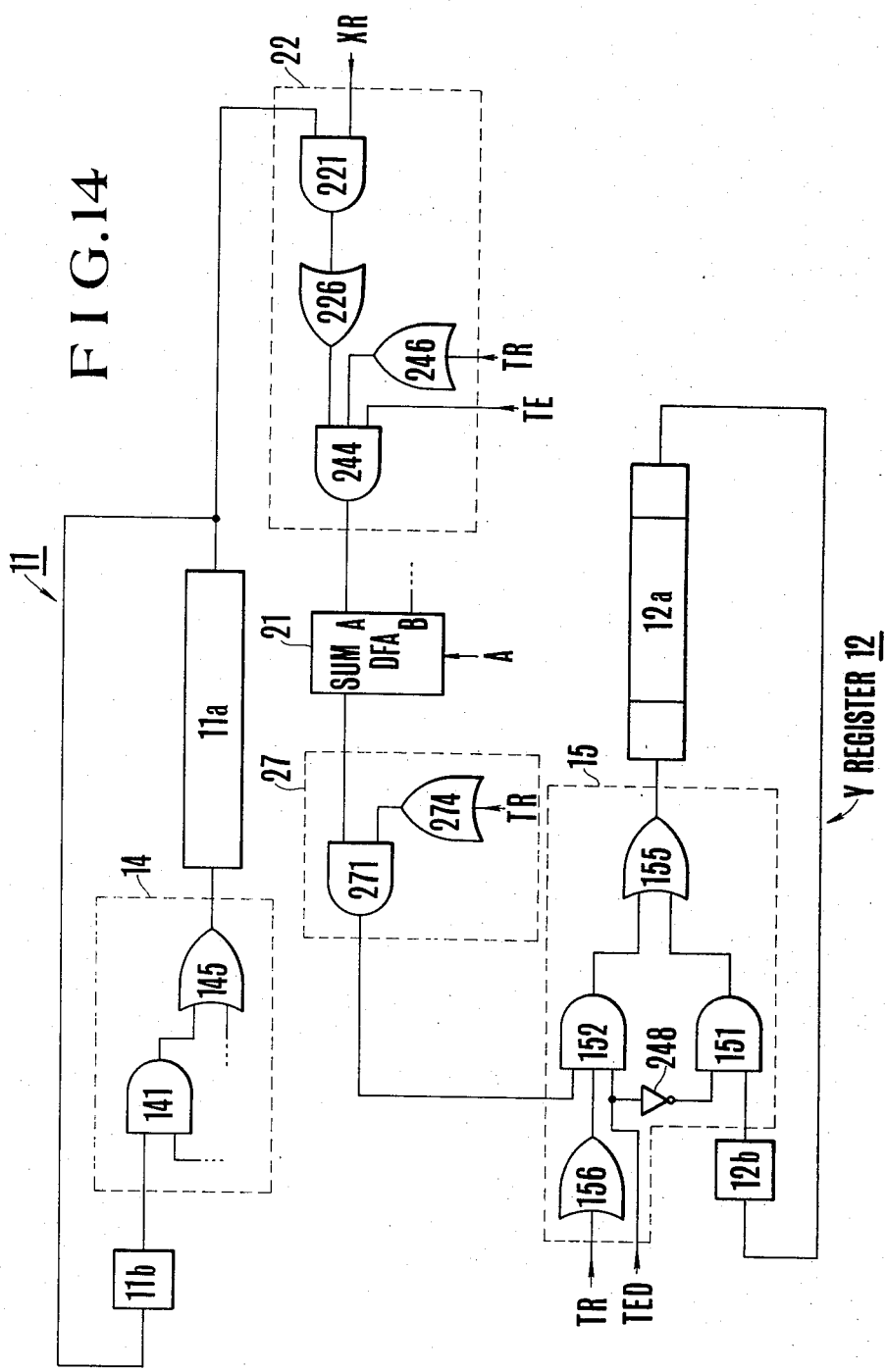

The transfer of the data from X register 11 to Y register 12 will be described hereunder with reference to FIG. 14. At this time a TR instruction is supplied to the gate circuits 15, 22 and 24 from the instruction decoder 20. Under these conditions, since instruction TR is supplied to inverter 247, the AND gate circuit 244 of the gate circuit 244 is disabled to inhibit any signal from reaching the input B of the delayed full adder 21. Further, an instruction TR is applied to the gate circuit 22 from the instruction decoder 22 so as to apply an addition instruction A to the delayed full adder 21.

Under these conditions, the content at the righthand end of register 11a of the X register 11 is applied to the input terminal A of the delayed full adder 21 via AND gate circuit 221, OR gate circuit 226 and AND gate circuit 244. The supply of this signal is performed at digit times $T_0 - T_{m+1}$ under the control of pulse TE.

Since no input is applied to input terminal B, the delayed full adder 21 produces its input A as the SUM output without any change which is sent to the gate circuit 15 via AND gate circuit 271. Since no instruction is applied to the gate circuit 27, its inverter 276 will not be supplied with a signal.

In the gate circuit 15, by considering the one digit delay caused by the delayed full adder 21 AND gate circuit 152 is enabled in response to pulse TED during an interval $T_1 - T_{m+2}$ so as to supply the output of the delayed full adder 21 to the input of the main register 12a of Y register 12.

The operation described above is performed for each digit and at the digit time $T_{m+2}$ and the data X that has been stored in X register 11 is transferred to Y register 12. In FIG. 14, reference numeral 156 designates an OR gate circuit and 151 an AND gate circuit.

The computation of the exponential function $a^X$ by using the exponential function computing apparatus shown in FIGS. 1 through 14 will be described with reference to the flow charts shown in FIGS. 15A and 15B.

Figure 15A:
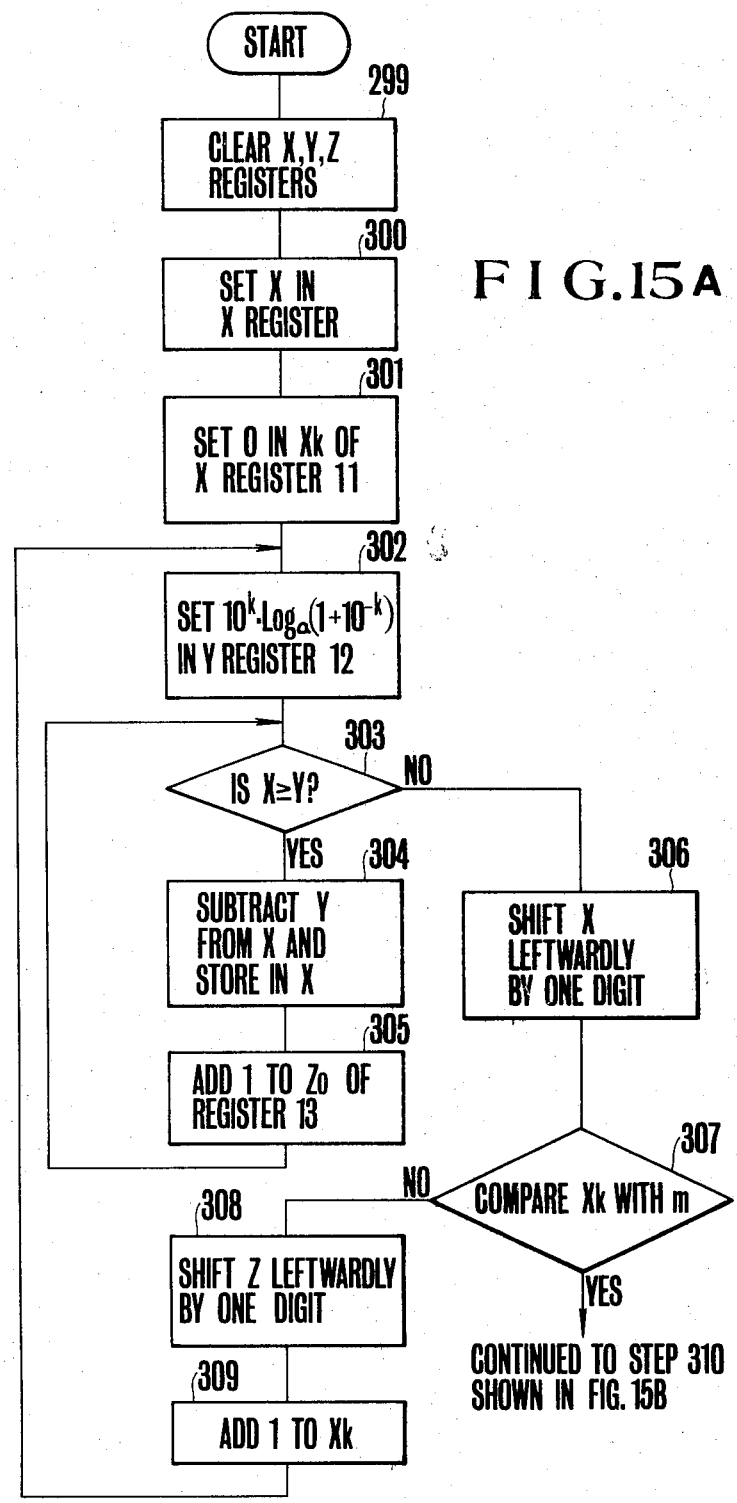
Figure 16:
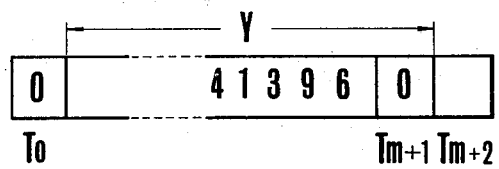
FIG. 16 is a diagram showing a status wherein $\log_e 2$ is set in the Y register.

At step 299 shown in FIG. 15A, the contents of X, Y and Z registers are cleared. Then at step 300 the power X to be computed is set in X register 11. At step 301 k=0 is set in register 11b of the X register 11 which stores $X_k$ according to item (6) by using the numerical data generator 25. Then, at step 302, $10^k \cdot \log_a(1+10^{-k})$ is set in Y register 12. This operation is performed according to item (6) by using the numerical data generator. At this steps where a=e(=2.71828) and when k=0, 0.693147 is set whereas when k=1, 0.95310 is set. The exponential power (data to be computed) has already been set at X of the register 11a. It is assumed that the decimal point is fixed at position $X_m$. Consequently, when a=e, the data set at Y of register 12a of Y register is k=0 as shown in FIG. 16. At step 303 a judgement is made whether the power set at X of register 11a is larger than $10^k \cdot \log_a(1+10^{-k})$ set in Y register 12 or not. If the power set at x in the X register is larger than or equal to the logarithmic value set in the Y register, the program sequence is advanced to step 304 where the value in the Y register is subtracted from the value in the X register and the remainder is stored in the X register. The program sequence is then advanced to step 305 where 1 is added to $Z_0$ of register 13. This value of $Z_0$ shows the number of the subtraction operations. After completing the step 305, the program is returned to step 303 where the value in the X register is again compared with the value in the Y register. If the value in the X register continues to be equal to or larger than the value in the Y register, the program is again advanced to step 304 to subtract Y of Y register 12 from X of X register 11 by using the delayed full adder 21. This operation is repeated until the delayed full adder 21 does not produce SUM output. At each time 1 is added to $Z_0$. At step 303, when X is judged to be smaller than Y, this state is detected by the fact that the J flip-flop circuit 28 is not supplied with any input, and the program is advanced to the next step 306. At this time, since the value of X is reduced by one digit, at the step 306 the value of X is shifted leftward by one digit. This operation is performed according to item (2). This operation is necessary because at step 302, data is loaded from $X_{m-1}$ so as not to decrease the number of the effective digits utilized in the computation. Accordingly, in a simple computer, step 306 can be omitted by setting $\log_a(1+10^{-k})$ at step 302.

When the operation at step 306 is completed, the program is advanced to step 307 where the value of $X_k$ of X register 11 is compared with the value of m which has been set in the numerical data generator 25 in accordance with item (5). When $X_k$ and m are equal, the program is advanced to step 310 shown in FIG. 15B.

If $X_k \neq m$, they are in a relation of $X_k < m$ so that the program is advanced to step 308 where Z of the Z register is shifted to the left by one digit so as to store the number of the subtraction operations effected at step 304 corresponding to the value of the next k. This operation is performed according to item (2). Upon completion of the shifting operation the program is advanced to step 309 where 1 is added to the value of $X_k$ to increment the value of k by 1 and the program is returned to step 302 for the purpose of decomposing the next value of k. Thereafter, the steps following step 302 are repeated until $X_k$ becomes equal to m.

When $X_k$ becomes equal to m the program is advanced to step 310. At this time, in the Z register 13 the number of subtracting operations $k = m - 1$ (i=0−m) is stored at $Z_i$. At this time, the X register contains the surplus of the subtraction operation. Although this step can be utilized for the purpose of increasing the accuracy, for simplifying the description, the surplus is herein cleared (at step 310 X is made 0). Thereafter, at step 311 the initial value 1 is loaded in $X_m$. Thereafter succeeding step 312 through 319 are executed.

Steps 312 through 319 constitute a routine for executing a multiplying operation effected by a rightward shift and an addition operation according the principle of this invention. At first, at step 312, $Z_0$ of Z register 13 is compared with 0 and when $Z_0$ is larger than 0 the program is advanced to step 313 where 1 is subtracted from $Z_0$. This subtraction operation is effected according to item (5) described above. If $Z_0=0$, the delayed full addflip-flop circuit 28 makes a judgement and the program is advanced to step 317. When $Z_0$ is larger than 0 and the necessary subtraction has been effected, the program is advanced to step 314 where the content of X register is transferred to Y of the Y register 12 according to the operation of item (7). After completing this step, at step 315 Y is shifted rightwardly by k digits to form data according to item (1). Then at step 316, this data is added to the value of X. When transferring data from X register to Y register the content of X register 11 is not cleared thereby circulating and holding the content. Upon completion this step, the program is returned again to step 312 for repeating the step following it.

Figure 17:
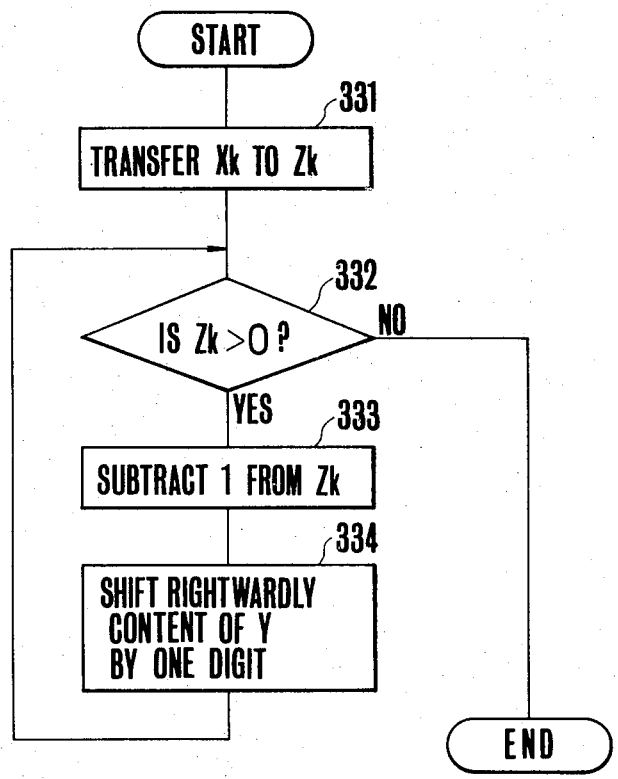
FIG. 17 is a flow chart showing rightward shifting operation by k digits utilized in the flow charts shown in FIGS. 15A and 15B.

The rightward shifting of Y by k digits can be executed by the combination of the instructions shown in FIG. 17, for example. Thus, at step 331 the value of $X_k$ of register 11 is transferred to $Z_0$ of Z register 13, and at step 332 while utilizing $Z_k$ as a counter, a judgement is made as to whether $Z_k$ is larger than 0 or not. If the result is yet, at step 333 1 is subtracted from $Z_k$. The program is then advanced to step 334 where the content of the Y register is shifted rightwardly by one digit. The program is then returned to step 332 where the reduced value of $Z_k$ is again compared with 0. This operation is repeated until the value of $Z_k$ equals 0, as determined at step 332, at which time the program is transferred to step 316 shown in FIG. 15B Turning back to FIG. 15B, steps 312 through 319 constitute a multiplying routine for a specific value of k. At step 312, when a borrow $B_0$ is generated, in other words the delayed full adder 21 does not produce a SUM output, the multiplying operation of the present value of k is completed. Then at step 317, Z is shifted rightwardly by one digit for the purpose of transferring the number of subtraction operations corresponding to the value of the next k to $Z_0$. Since the value of k is smaller by 1 than the previous value, at step 318 1 is subtracted from $X_k$. When all data of the subtraction operation which have been stored in Z become 0 the computation is terminated. This state is confirmed at step 319. This operation is executed according to item (5).

If $Z=0$, no computation is necessary even when $k>0$. The value of X at the termination of the computation when Z becomes 0 at step 319, is the value of the exponential function to be determined.

In the first embodiment described above although the value of $\log_a (1+10^{-k})$ or $10^k \cdot \log_a (1+10^{-k})$ was loaded in the Y register at step 302 and subtraction operation was made at step 304 by using that value, if the numerical data generator 25 were constructed such that it sends to the input B of the delayed full adder the value of the least significant bit as time $T_1$, the value of the next bit at time $T_2$ and so on, and if the output of X were applied to the input A of the delayed full adder 21 to produce a subtraction instruction the step 302 shown in FIG. 15A would become unnecessary so that step 304 may be labelled as "substract $\log_a(1+10^{-k})$ from X and store the result in X" or "subtract $10^k \cdot \log_a (1+10^{-k})$ from X and store the result in X". It is to be understood that various registers shown in FIG. 1 may be substituted by other memory devices, for example a random access memory device (RAM).

According to the embodiment described above, it is possible to construct the computation apparatus for determining an exponential function $a^X$ by using such simple electronic computer as utilized in table computers.

Figure 18:
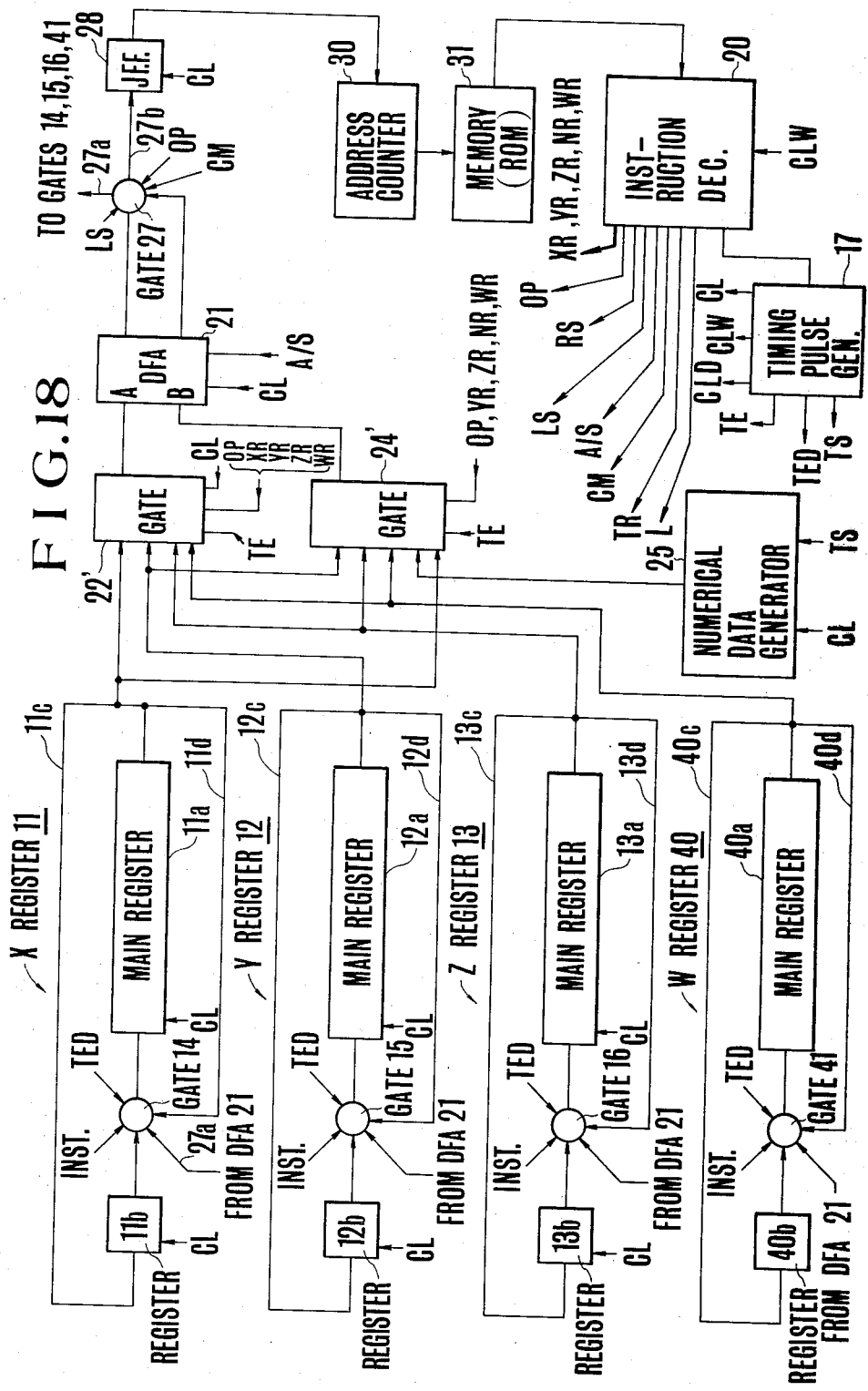
FIG. 18 is a block diagram showing another embodiment of this invention.

FIG. 18 shows a modified embodiment of exponential function $a^X$ computing apparatus according to this invention which differs from the embodiment shown in FIG. 1 in the following points. Thus, in addition to the X, Y and Z registers 11, 12 and 13, a W register 40 of the same construction is added. Briefly stated, the W register 40 comprises a main register 40a (corresponding to the main register 11a), a register 40b (corresponding to register 11b) connected to the output end of the main register 40a through a line 40c, and a gate circuit 41 (corresponding to gate circuit 14) connected between the output of the register 40b and the input of the main register 40a. The gate circuit 41 is connected to receive the output of the main register 40a through a line 40d, a pulse TED supplied from the timing pulse generator 17 (this pulse is used to compensate for the one digit delay caused by the delayed full adder 21), instruction from the instruction decoder 20, the input and output of the gate circuit 27, that is the output of the delayed full adder 21. Similar to the other registers 11, 12 and 13, the output of the W register 40 is applied to gate circuits 22' and 24 from the righthand end of the W register 40. The W register 40 operates in the same manner as the X register described in connection with the first embodiment.

The embodiment shown in FIG. 18 operates in the same manner as the first embodiment except the following point.

More particularly, during the addition-subtraction operations between registers as defined in item (3) when instructions necessary for the addition-subtraction operations are supplied, the output of the X register 11 or W register 40 is selectively applied to the input A of the delayed full adder 21 by the action of the gate circuit 22'. The output SUM of the full adder 21, or the result of addition-subtraction operations is stored in the X register 11 or W register 40 via the gate circuit 27.

During the subtraction operation of the register and the numerical data under item (4), either one of the outputs of X, Y, Z and W registers is selected as the input to input A of the delayed full adder 21.

Also to the addition-subtraction operations between the registers according to item (3), is added the addition-subtraction operations between the W register and the other registers.

The method of computing the exponential function $a^X$ by using the hardware shown in FIG. 18 will be described with reference to the flow charts shown in FIGS. 19A and 19B. Thus, at step 401 shown in FIG. 19A, the contents of the X, Y, Z and W registers 11, 12, 13 and 40 are cleared. Then at step 402, the exponent power is set at X of the X register 1, and at step 403, $k=0$ is set at $X_k$ of the X register 11. At step 404 the initial value 1 is set at $W_m$ of the W register 40. It is now assumed that the data of the respective registers are normalized to have a decimal point at the position of $T_{m+1}$. For the purpose of simplifying the description, the position of the decimal point was determined as above described, actually however, the value of a power of 10 is stored at X, Y, Z and W of respective registers. Accordingly, data 1 is set at $W_m$ of the W register.

At step 405, $10^k \cdot \log_a(1+10^{-k})$ is set in Y register 12 according to the value of k. Where $a=10$, and when $k=0$, 0.301029 is set whereas when $k=1$, 0.413926 is set. FIG. 20 is a graph showing a status in which data 0.413926 has been set in the Y register 12. Since the power to be computed has already been set in the X register 11, the multiplying operations for respective values of k are executed according to the principle of this invention as steps 406 through 412.

More particularly, at step 406, the X register is compared with the Y register wherein Y is subtracted from X and where a borrow does not occur, the program is advanced to step 407. Thus, one multiplying operation must be executed for each value of k. For this reason, at step 408, the content of W register 40 is transferred to Z register 13 and at step 409 the content of Z register 13 is shifted rightwardly by k digits. This rightward shifting operation by k digits can be executed by constructing the instructions as shown in FIG. 21. Thus, at step 431, $X_k$ of X register 11 is transferred to $Z_k$ of Z register 13 to hold the present value of k at $X_k$. Then at step 432 a judgement is made whether $Z_k$ is larger than 0 or not. If the result is yes, at step 433, 1 is subtracted from $Z_k$ in a range not to form a borrow. Thereafter, at step 434, the content of the Z register is shifted rightwardly by one digit. In this manner, the content is shifted rightwardly by k times.

Subsequent to the step 409, at step 409a, the contents of W and Z registers are added together and the result is stored in W register according to item (6). Thereafter the program is returned to step 406 where a judgement is made as to whether the content of X register is larger than that of the Y register to check the presence or absence of $B_0$. This routine is repeated and when a borrow $B_0$ is found at the comparison step 406, the program sequence is transferred to step 410 shown in FIG. 19B. At this time, the content of the X register is smaller than that of the Y register by one digit. Accordingly, at step 410 the content of X register is shifted leftwardly by one digit. This corresponds to the setting of the logarithmic value always at the digit of $X_{m-1}$ at step 405. Consequently, it is possible to determine the value of the exponential function without decreasing the number of the effective digits utilized for the computation. However, in the case of a simple computer, at step 405, it is possible to set $\log_a(1+10^{-k})$ thus omitting step 410. After completing the steps described above, at step 411, a judgement is made whether the value of $X_k$ coincides with m or not. If $X_k \neq m$, at step 412, 1 is added to the content of the main register 11a and X register thus incrementing the value of k by 1. If $X_k = m$, all computing operations are terminated and the value of the exponential function being sought is obtained by the W register.

In the second embodiment described above, at step 405, $10^k \cdot \log_a(1+10^{-k})$ or $\log_a(1+10^{-k})$ was set in the Y register and then at step 407 the content of Y register was subtracted from that of X register 11. However, when the numerical data generator 25 is constructed to generate special instructions such that it generates the data of the least significant digit at time $T_1$, the data of the next digit at $T_2$ . . . and the data of the most significant digit at $T_{m+1}$, it become possible to execute the operation that "subtract $\log_a(1+10^{-k})$ from the content of X register and then store the result in X register" or "subtract $10^k \cdot \log_a(1+10^{-k})$ from the content of X register 11 and then store the result in X register" at step 407, thus eliminating step 405. In that event step 406 should be "Is $X \geq 10^k \cdot \log_a(1+10^{-k})$?". With this method it is not necessary to use the Y register 12. Although, in this modified embodiment too, registers were used as the memory devices, as above described it is possible to substitute RAMs for these registers.

This modification too can use a simple electronic computer of the table type.

Figure 22A:
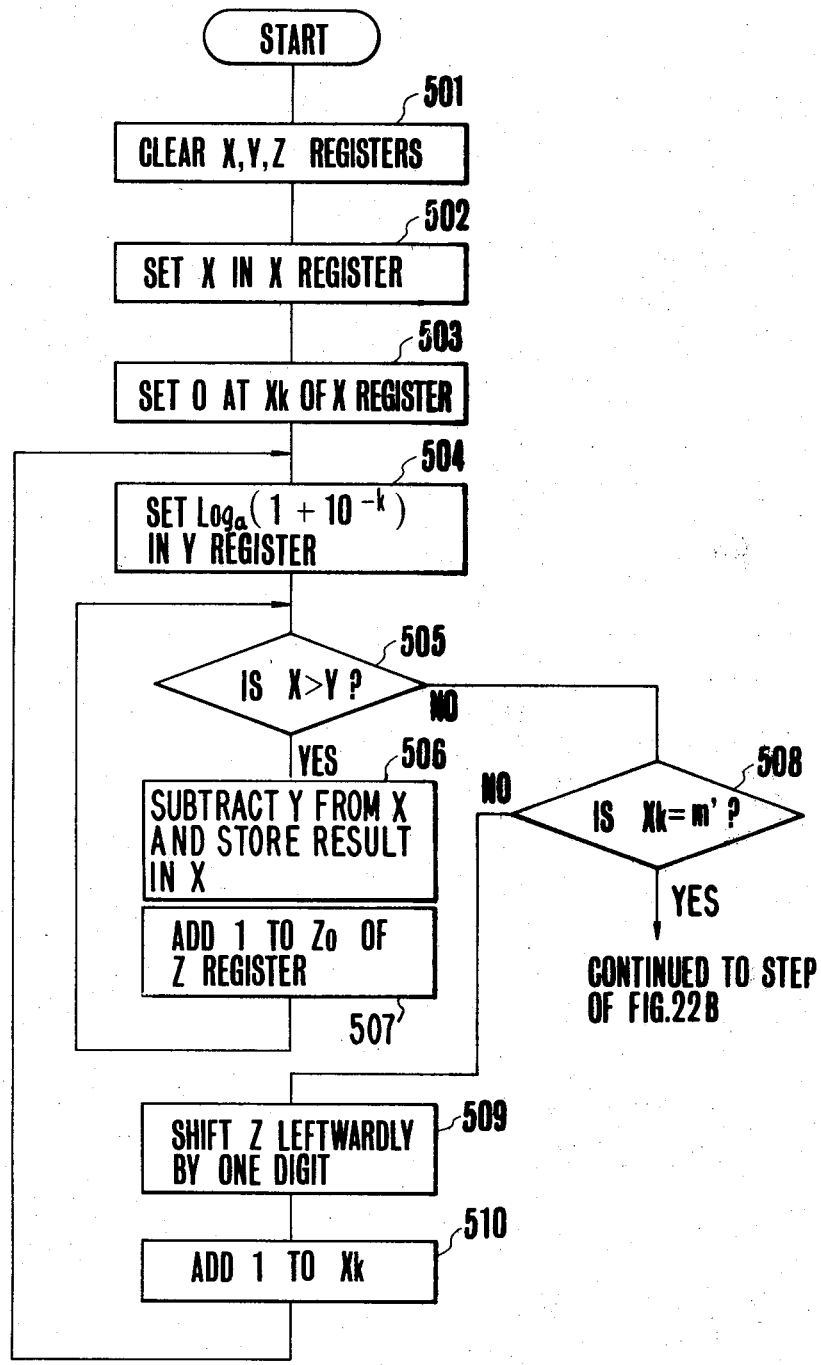
FIGS. 22A and 22B show another examples of the flow charts showing a case wherein $e^X$ is computed with the computing apparatus shown in FIG. 18.
Figure 22B:
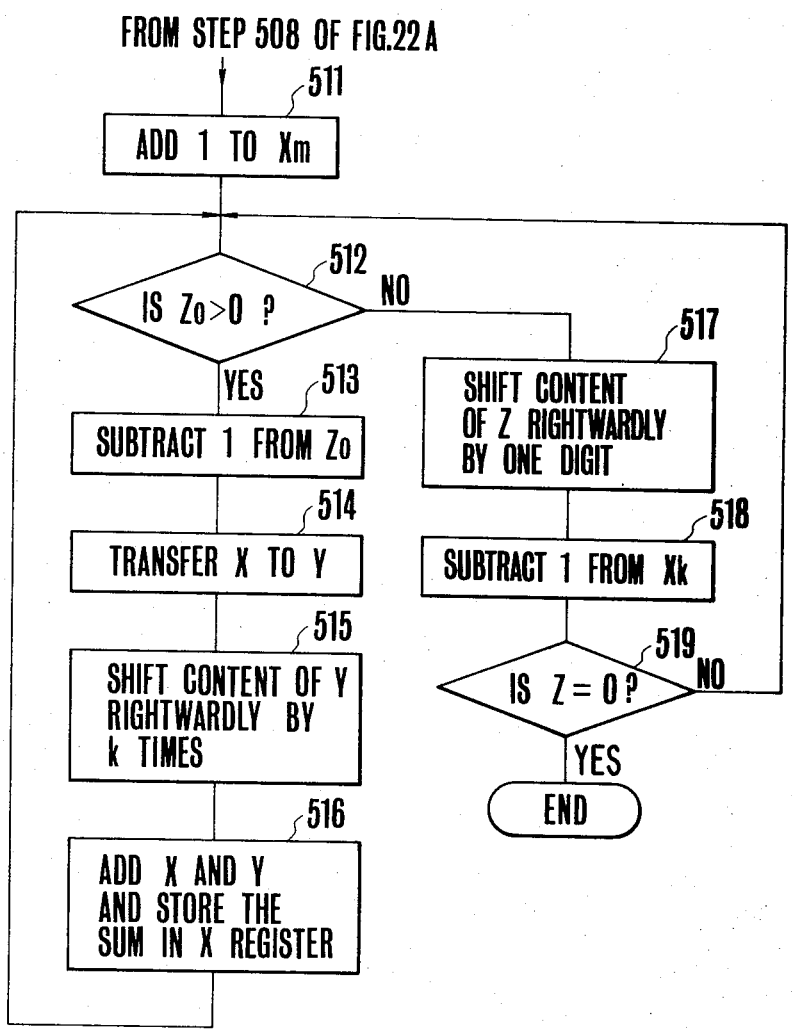

In the special case where a=e, the embodiment shown in FIG. 18 can be modified. The operation of this modification will be described with reference to the flow charts shown in FIGS. 22A and 22B.

Figure 24:
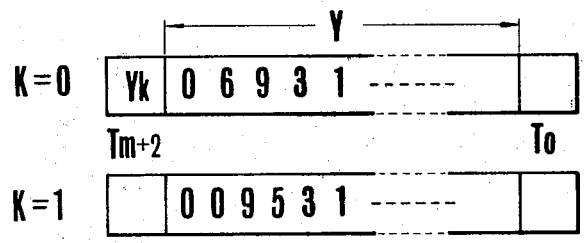

At first, at step 501, the contents of the X, Y, and Z registers 11, 12 and 13 are cleared. Then at step 502 the power x of the exponential function $e^x$ is set in X register, and at step 503 k=0 is set at $X_k$ of X register 11. At step 504, $\log_3(1+10^{-k})$ is set at Y of Y register 12, and at step 505, the content of X register 11 is compared with the content $\log_e(1+10^{-k})$ of Y register to judge whether the delayed full adder 21 produces a borrow $B_0$ or not. In the absence of $B_0$, at step 506 the content of Y register 12 is subtracted from x that is the power and the result is stored in X register 11. Then the program is advanced to step 507 where 1 is added to $Z_0$ of Z register thereby storing the number of the subtraction operations. When the delayed full adder produces a borrow $B_0$ the program is advanced to step 508, where the value of $X_k$ of the X register is compared with value m' ($0 < m' < m$) of k. If $X_k \neq m'$, the program is advanced to step 509 where the content of the Z register 13 is shifted leftwardly by one digit. Thus, it is possible to clear the value of $Z_0$ by shifting the same by one digit. Then at step 510 the value of k is incremented by "1" and the program is returned to step 504 for resolving the value of the next k. FIG. 24 are diagrams showing the status in which $\log_e(1+1)$ and $\log_e(1+0.1)$ are respectively set in the Y register. As can be clearly noted from FIG. 24, the data is normalized such that the decimal point is located at the $T_{m+1}$ (mnemonic $X_m$). The routine described above is repeated until $X_k$ becomes equal to m' at which time the program sequence is transferred to step 511 (FIG. 22B) where the resolution of equation (6) proceeds such that the value of $C_r$ is stored in the Z register until the value of m' shown by equation (15).

Figure 23:
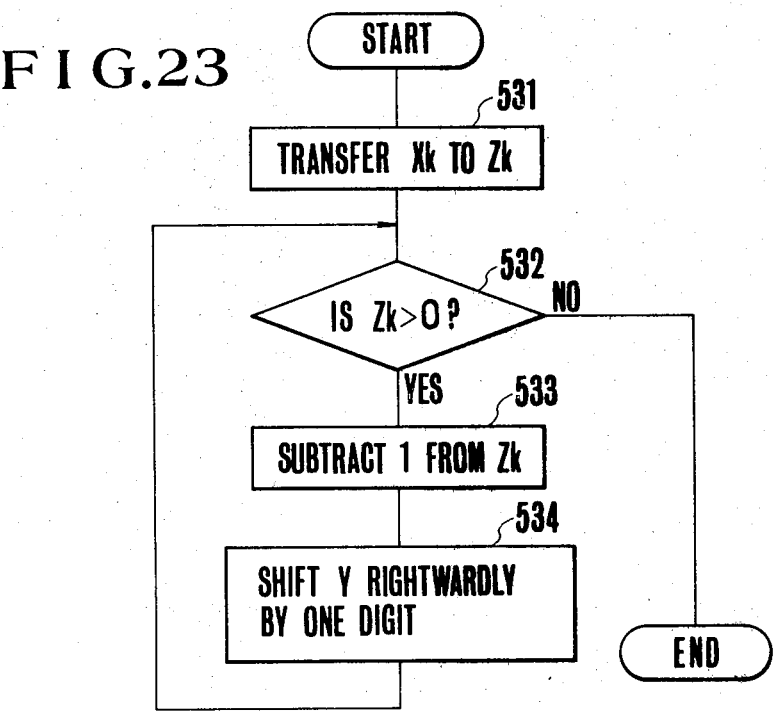
FIG. 23 is a flow chart to perform the rightward shifting operation by k digits utilized in the flow charts shown in FIGS. 22A and 22B and FIGS. 24 and 25 are diagrams showing the status in which $\log(1+10^{-k})$ and $10^k \cdot \log(1+10^{-k})$ are set in the Y register when $k=0$ and $k=1$.

As a result of adding 1 to $X_m$ at step 511, the last term of equation (16) will be stored in X register. Steps 512 through 519 show the multiplying routine expressed by equation (16). When the program sequence firstly arrives at the step 512, the value of $Z_0$ becomes to correspond to $X_k = m'$. If $Z_0 \neq 0$, since it is possible to subtract it from $Z_0$ without generating a borrow $B_0$ the program is advanced to step 513 where 1 is subtracted from $Z_o$. The program is then advanced to step 514 where the content of the X register is transferred to the Y register, and at step 515, the content of the Y register is shifted rightwardly by k digits without destroying the content of the X register. Shifting of the content of Y rightwardly by a number of times corresponding to the value of k may be effected by a routine as shown in FIG. 23. More particularly, at step 531, the value of $X_k$ of the X register 11 is transferred to $Z_k$ of Z register 13. At step 532, a judgement is made whether $Z_k$ is larger than 0 or not. If the result is yes, at step 533 1 is subtracted from $Z_k$ and then at step 534 the content of Y register is shifted rightwardly by one digit. These steps are repeated so long as it is possible to subtract 1. When $Z_k = 0$ at step 532, the program is transferred back to step 516 where the content of the X and Y registers are added and the sum is stored in the X register. This means one multiplying operation. The program sequence is then returned to step 512. At step 512, if a borrow $B_0$ appears the multiplying operation for the present value of k is completed. Accordingly, at step 517 the content of the Z register is shifted rightwardly by one digit to apply data corresponding to the new value of k to $Z_0$. Since the value of new k is smaller than the value of previous k by 1, it is necessary to subtract 1 from $X_k$ at step 518.

When the number of the subtraction operations stored in the Z register becomes 0, the computation is finished which is confirmed at step 519.

Figure 25:
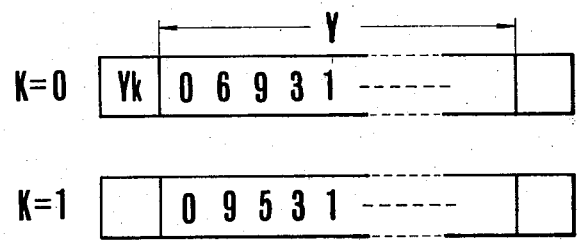

As above described, according to this invention, it is possible to determine the value of an expontential function at high speeds and at high accuracies with such simple apparatus as a table type electronic computer. For the purpose of improving the accuracy, $10^k \cdot \log_a (1+10^{-k})$ is set instead of $\log_a (1+10^{-k})$. Then, as shown in FIG. 25, since the logarithmic data covers the all effective digits of Y register, it is possible to increase the degree of accuracy of the subtraction operation executed at step 506. However it is necessary to add a step between steps 505 and 508 in which an instruction "shift the content of X register 11 leftwardly by one digit and store the result in X register". Moreover, when $X_k$ becomes equal to $m'$ at step 508, since the content of the X register takes the form of $$10^k \times (C_k \cdot 10^{-k} + C_{k+1} \cdot 10^{-(k-1)} + \ldots + C_{n-1} \cdot 10^{-(n+1)})$$

it becomes necessary to shift rightwardly the content of X register by k times for the purpose of normalizing again. However this processing is simple.

As above described, according to this invention, a multiplying operation can be executed in a short time by data shifting and addition operations, thus making it possible to control as desired the accuracy of computation by varying the word length of the internal constants. Moreover by varying the constants, it is possible to compute expontential functions having different bases.

It should be understood that the invention is not limited to the illustrated embodiment and that various changed and modifications will be obvious to one skilled in the art.

What is claimed is:

1. Apparatus for computing an expoential function $a^X$ with an N radix computer where a represents a positive constant and X a variable, comprising:

generating means for generating a logarithmic value $\log_a (1+N^{-k})$ or $N^k \cdot \log_a (1+N^{-k})$ where $k = 0, 1, 2 \ldots m$ and where said positive constant a $(a \neq 1)$ is the base of the logarithm;

first memory means;

subtracting means for performing a subtraction operation wherein a given said logarithmic value generated by said generating means is repeatedly subtracted from the contents of said first memory means and the remainder of each subtraction is stored in said first memory means, said subtractions being repeated until said contents of said first memory means is reduced to a value less than said logarithmic value;

determining means for determining the number of repeated subtractions which occurs in said subtraction operation and the corresponding value of k used to generate said given logarithmic value used in said subtraction operation;

decomposing means for setting a value corresponding to said variable X in said first memory means and for the carrying out a decomposing sequence wherein said generating means is caused to sequentially generate said logarithmic value for in a range from $k = o$ to $k = m$ and, for each logarithmic value generated, said subtracting means is caused to perform said subtraction operation;

second memory means;

third memory means;

shifting means for carrying out a shifting sequence wherein a value corresponding to the contents of said second memory means is stored in said third memory means, the contents of said third memory means are shifted k number of digits in a predetermined direction, the shifted contents of said third memory means are added to the contents of said second memory means and the sum is stored in said second memory means; and multiplication means for detecting the termination of said decomposing sequence and, upon said termination, for setting an initial value I in said second memory means and then for causing a multiplication sequence wherein said shifting means is caused to carry out said shifting sequence for each of said subtractions of said subtracting means caused by said decomposing means, with the number of said shifting sequences and said corresponding value of k used in each said shifting sequence being determined by said determining means;

whereby upon termination of said multiplication sequence, the contents of said second memory means correspond to the value of $a^X$.

2. The apparatus of claim 1 wherein said initial value I is a function of the contents of said first memory means upon termination of said decomposing sequence.

3. The apparatus of claim 1 wherein said initial value I is 1.

4. The apparatus of claim 1 wherein both said first memory means and said second memory means constitute a single fourth memory means.

5. The apparatus of claim 4 wherein said initial value I a function of the contents of said fourth memory means upon termination of said decomposing sequence.

6. The apparatus of claim 4 wherein said initial value I is 1.

7. The apparatus of claim 1 wherein said subtracting means further includes a memory means for storing said logarithmic values when said subtraction operations are performed.

8. Apparatus for computing an expontential function $a^X$ with an N radix computer where a represents a positive constant and X a variable, comprising:

generating means for generating a logarithmic value $\log_a (1+N)^{-k}$ or $N^k \cdot \log_a (1+N^{-k})$ where $k = 0, 1, 2 \ldots m$ and where said positive constant a $(a \neq 1)$ is the base of the logarithm;

first memory means;

subtracting means carrying out a subtraction operation wherein said logarithmic value is subtracted from the contents of said first memory means and the remainder is stored in said first memory means;

second memory means;

third memory means;

first shifting means for carrying out a first shift operation wherein a value corresponding to the contents of said second memory means is stored in said third memory means, said contents of said third memory means are shifted in a first predetermined direction k number of digits, and the shifted contents are added to said contents of said second memory means;

second shifting means for carrying out a second shift operation wherein the contents of said first memory means are shifted by one digit in a second direction opposite said first direction;

sequencing means for storing an initial value I in said second memory means, for storing a value corresponding to said variable X in said first memory means, for causing said generating means to sequentially generate said logarithmic value in a range from k=o to k=m and, for each logarithmic value generated, for carrying out a sequence wherein said subtracting means and said first shifting means are repeatedly caused to carry out said subtraction operation and said first shift operation, respectively, until said contents of said first memory means are reduced to a value less than said logarithmic value, at which time said second shift means is caused to carry out said second shift operation;

whereby upon termination of the final second shift operation for k=m, the contents of said second memory means correspond to the value $a^X$.

9. The apparatus of claim 8 wherein the initial value I is 1.

10. Apparatus for computing an expotential function $a^X$ with an N radix computer where a represents a positive constant and X a variable comprising:

generating means for generating a logarithmic value $\log_a(1+N^{-k})$ or $N^k \cdot \log_a(1+N^{-k})$ where k=0, 1, 2 . . . m and where said positive constant a ($a \neq 1$) is the base of the logarithm;

first memory means;

subtracting means for carrying out a subtraction operation wherein said logarithmic value is subtracted from the contents of said first memory means and the remainder is stored in said first memory means;

second memory means;

third memory means;

shifting means for carrying out a shift operation wherein a value corresponding to the contents of said second memory means is stored in said third memory means, the contents of said third memory means are shifted in a predetermined direction k number of digits and the shifted contents are added to said contents of said second memory means;

sequencing means for storing on initial value I in said second memory means, for storing a value corresponding to said variable X in said first memory means, for causing said generating means to sequentially generate said logarithmic value in a range from k=o to k=m and, for each logarithmic value generated, for carrying out a sequence wherein said subtracting means and said shifting means are repeatedly caused to carry out said subtraction operation and said shift operation, respectively, with each of said sequences terminating when said remainder stored in said first memory means is less than the particular logarithmic value used in such sequence;

whereby upon termination of the final one of said sequences where k=m, the contents of said second memory means corresponds to the value $a^X$.

11. The apparatus of claim 10 wherein said initial value is 1.

* * * * *